(12) United States Patent
Azuela

(10) Patent No.: US 10,098,338 B2
(45) Date of Patent: Oct. 16, 2018

(54) STACKABLE CREATURE CONTROL MEMBER, A STACKED ASSEMBLY OF CREATURE CONTROL MEMBERS AND MOUNTING ASSEMBLIES THEREFORE

(71) Applicant: Juan Victor Azuela, Battle Creek, MI (US)

(72) Inventor: Juan Victor Azuela, Battle Creek, MI (US)

(*) Notice: Subject to any disclaimer, the term of this patent is extended or adjusted under 35 U.S.C. 154(b) by 181 days.

(21) Appl. No.: 14/693,715

(22) Filed: Apr. 22, 2015

(65) Prior Publication Data

US 2016/0309694 A1    Oct. 27, 2016

(51) Int. Cl.
*A01M 1/14* (2006.01)
*A01M 23/00* (2006.01)

(52) U.S. Cl.
CPC .......... *A01M 1/145* (2013.01); *A01M 23/005* (2013.01)

(58) Field of Classification Search
CPC ............................ A01M 1/145; A01M 23/005
See application file for complete search history.

(56) References Cited

U.S. PATENT DOCUMENTS

| | | | |
|---|---|---|---|
| 2,670,076 A | 2/1954 | Monks | |
| 3,080,997 A | 3/1963 | Brown | |
| 3,449,856 A * | 6/1969 | Weaver | A01M 3/022 43/115 |
| 3,567,067 A | 3/1971 | Weiss | |
| 4,103,382 A | 8/1978 | Gitt | |
| 4,126,959 A | 11/1978 | Graham | |
| 4,722,442 A | 2/1988 | Smith | |
| 4,919,268 A | 4/1990 | Young | |
| 5,609,321 A | 3/1997 | McClellan | |
| 6,044,584 A * | 4/2000 | Lynn | A01M 3/022 43/136 |

(Continued)

*Primary Examiner* — Jessica B Wong
(74) *Attorney, Agent, or Firm* — Merek, Blackmon & Voorhees, LLC

(57) ABSTRACT

A stackable creature control member, a stacked assembly of creature control members and mounting assemblies for mounting in an operating position the stackable creature control member and/or the stacked assembly of creature control members. The stackable creature control member has a creature control substance applied over a planar or a non-planar surface. i.e., a surface having a plurality of points each of which has a different z-axis coordinate. The stackable feature of the creature control members allows the creature control members to be stacked for packing, shipping and/or use. The stackable assembly allows an individual to readily separate one creature control member from a directly adjacent creature control member without any liner or other separating member being present between adjacent creature control members. Preferably, the stacked assembly of creature control members in the stacked state is located in an operating position by a mounting assembly and individual creature control members are readily and easily removable from the stacked assembly as needed. Preferably, the creature control substance applied to a portion of the creature control members is either a creature trapping substance for trapping creatures on the creature control member or a repellent for repelling birds from the creature control member and/or the surrounding area.

20 Claims, 41 Drawing Sheets

(56) References Cited

U.S. PATENT DOCUMENTS

| | | |
|---|---|---|
| 6,325,213 B1 | 12/2001 | Henry |
| 7,793,461 B2 | 9/2010 | Klein |
| 8,567,114 B1 | 10/2013 | Drapeau |
| 2008/0040967 A1 | 2/2008 | Young |
| 2008/0163409 A1 | 7/2008 | Humiston |
| 2010/0192432 A1 | 8/2010 | Pereira |
| 2012/0124888 A1 | 5/2012 | Lemberg |
| 2012/0174470 A1* | 7/2012 | Studer .................. A01M 1/145 43/113 |
| 2013/0047498 A1 | 2/2013 | Keim |
| 2013/0152451 A1* | 6/2013 | Larsen .................. A01M 1/04 43/113 |
| 2013/0318854 A1 | 12/2013 | Zhang |
| 2014/0059920 A1* | 3/2014 | Messina ............... A01M 1/2011 43/131 |

* cited by examiner

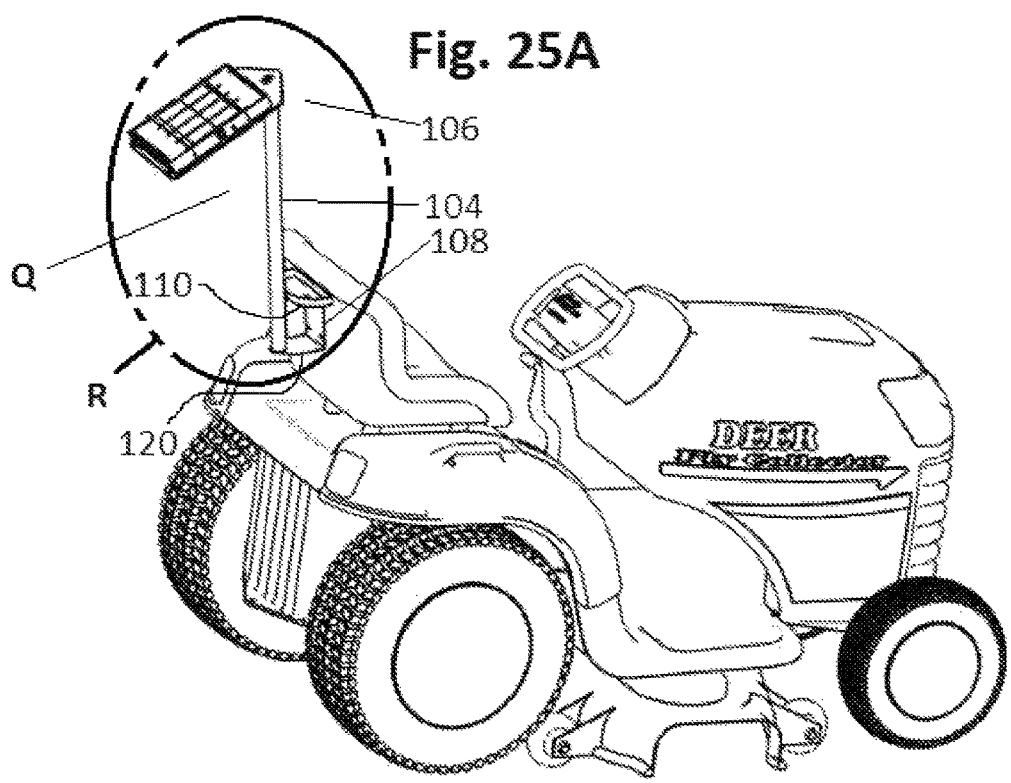
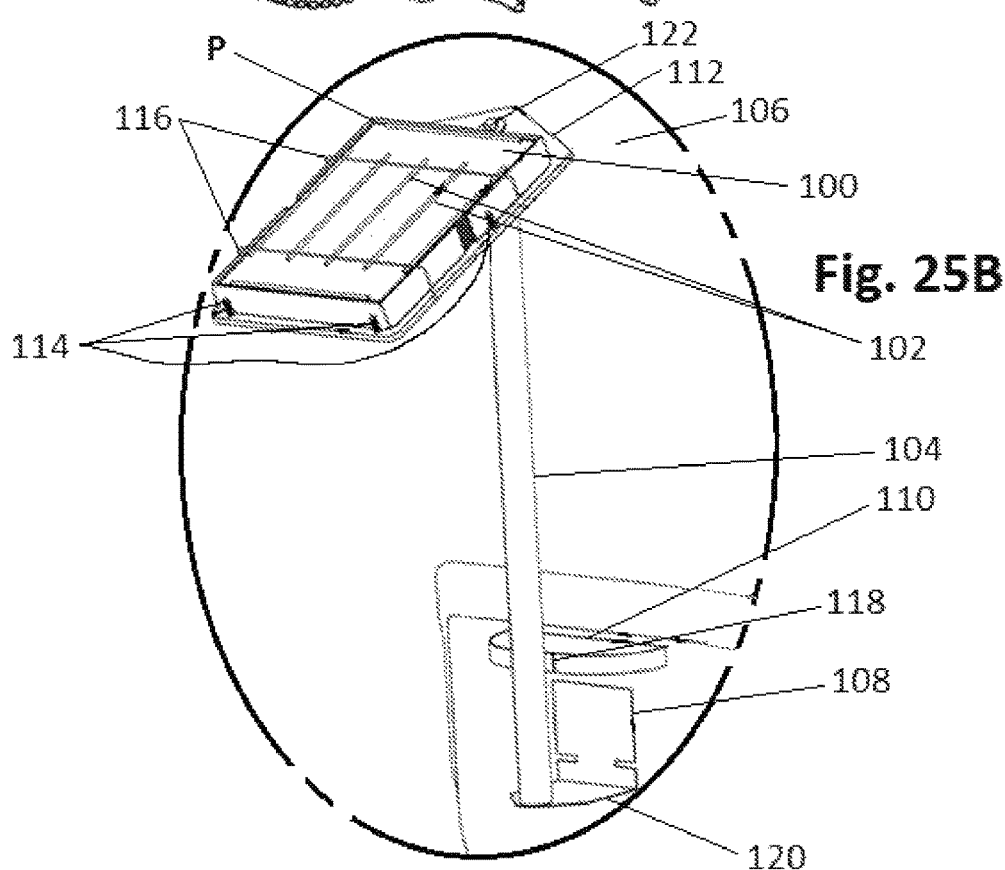

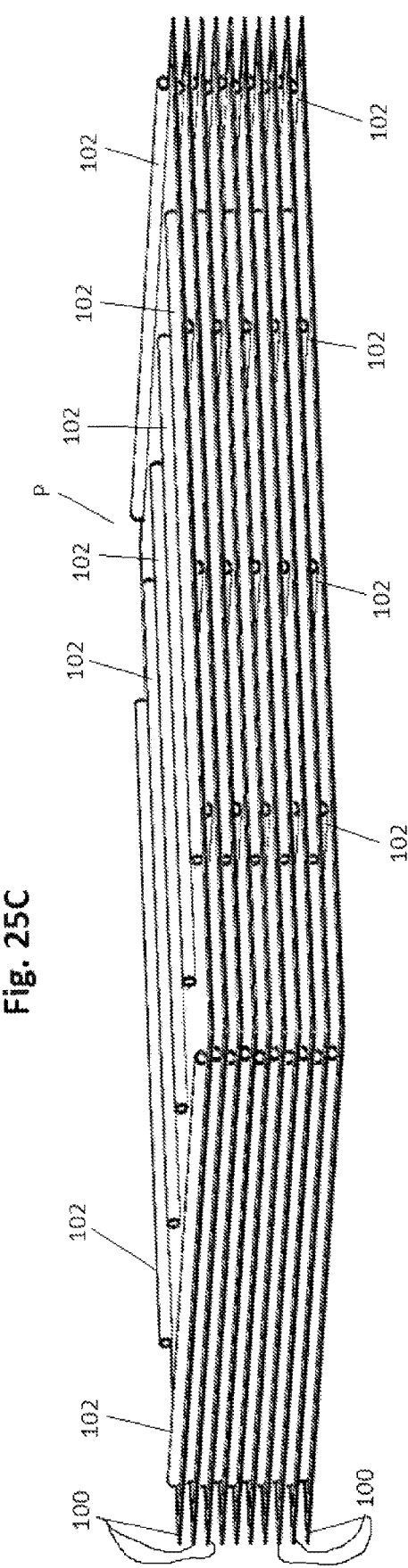

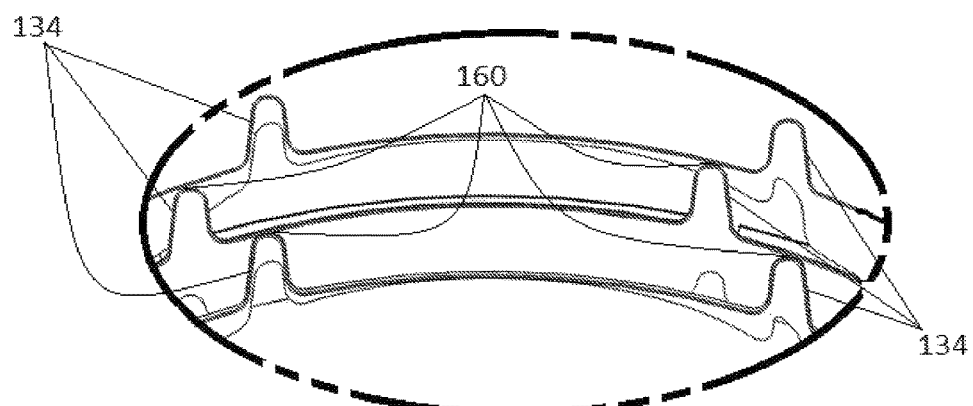
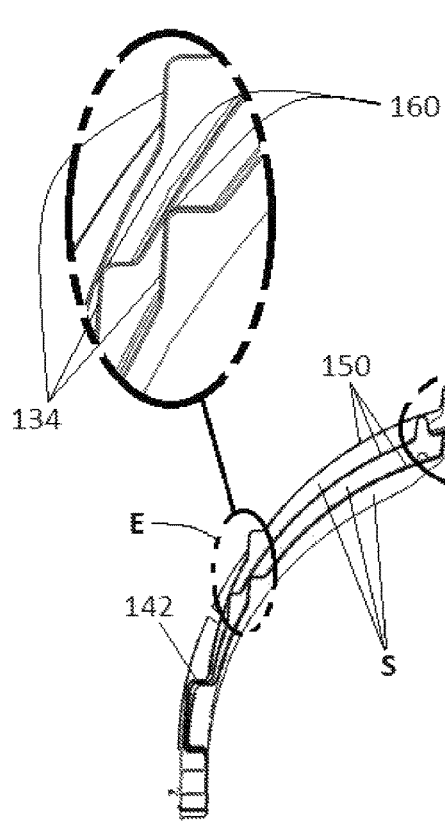
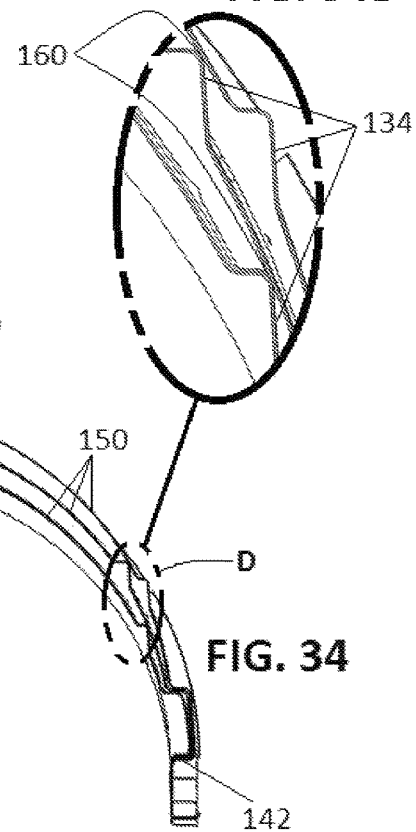

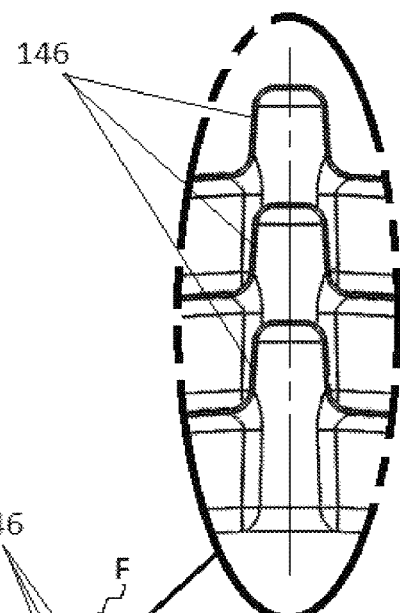
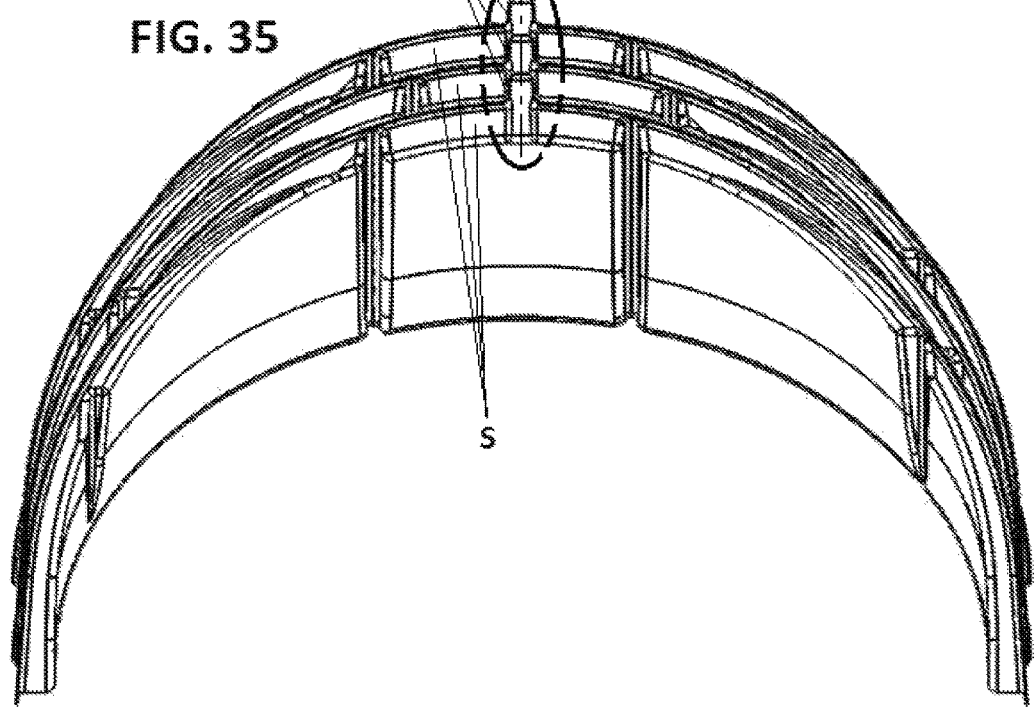

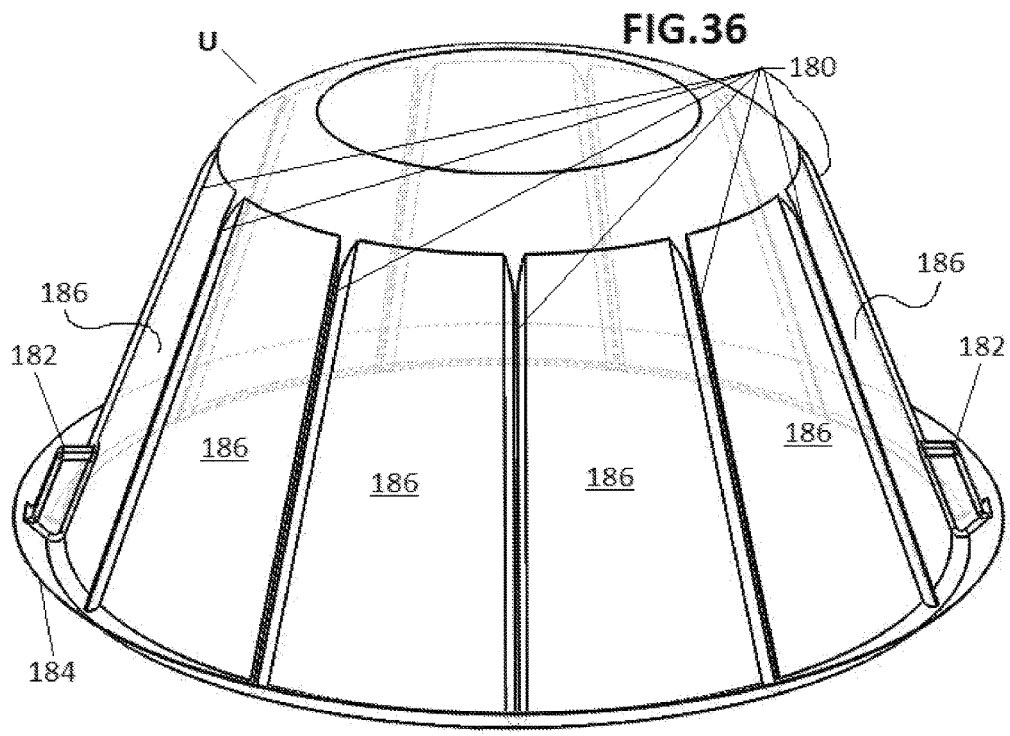
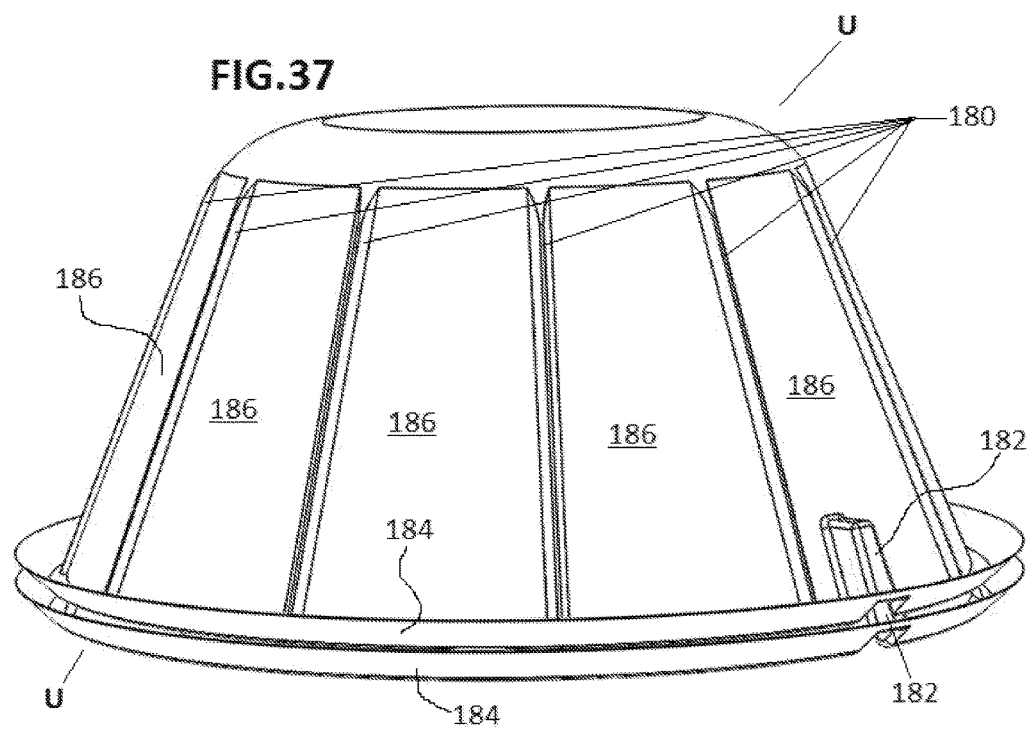

STACKABLE CREATURE CONTROL MEMBER, A STACKED ASSEMBLY OF CREATURE CONTROL MEMBERS AND MOUNTING ASSEMBLIES THEREFORE

FIELD OF THE INVENTION

The present invention is directed to a stackable creature control member, a stacked assembly of creature control members and mounting assemblies for mounting in an operating position the stackable creature control members and/or the stacked assembly of creature control members. More specifically, a preferred form of the present invention is directed to a stackable creature control member having a creature control substance applied over a planar or a non-planar surface. i.e., a surface having a plurality of points each of which has a different z-axis coordinate (hereinafter referred to a three dimensional surface or 3D surface). The stackable feature of the creature control members allows the creature control members to be stacked for packing, shipping and/or use. The stackable assembly allows an individual to readily separate one creature control member from a directly adjacent creature control member without any liner or other separating member being present between adjacent creature control members. Rather, the creature control member is itself configured to facilitate removal of one creature control member from a directly adjacent creature control member. In some preferred forms of the present invention, the stacked assembly of creature control members in the stacked state is located in an operating position by a mounting assembly and individual creature control members are readily and easily removed from the stacked assembly as needed. In the preferred embodiments, the creature control substance applied to a portion of the creature control members is either a creature trapping substance for trapping insects or other creatures including but not limited to mice on the creature control member or a repellent for repelling birds from the creature control member and/or the surrounding area.

BACKGROUND OF THE INVENTION

The control of creatures likes insects, birds, mice, etc. is a significant concern to many individuals. For example, female deer flies (*chrysops callidus* of the family Tabanidae) are extremely aggressive insects which attack, harass and annoy humans and livestock. They are considered difficult to control because they can infest large properties and have random migration patterns. Deerflies are just one example of creatures that annoy and harass individuals in their daily lives. Birds and the droppings they leave behind are another annoying creature which many individuals are confronted with in their day-to-day routine. Accordingly, a number of creature control devices have been developed. However, these previously developed devices suffer from a number of disadvantages inherent in their design and/or the type of creature control substance used to control the particular creature. For example, most if not all manufactures of low viscosity wet-gel adhesive (LVWGA) type creature control substances sell these substances as aerosol sprays, in canisters, in small tubes, or caulk gun tubes. This packaging requires the consumer to perform the messy tasks of applying and removing the adhesives/creature control substance. The consumer is further required to create their homemade creature control device on which the creature control substance is to be applied and removed if reuse of the device is desired. Notably, at the present time, packaging of any creature control device having a pre-applied LVWGA is virtually nonexistent.

Because LVWGA substances are like syrup with extremely low viscosity and stick to everything, special sheet release paper, a sheet release liner, or sheet release barrier cannot be used to separate adjacent creature control members.

For higher viscosity pressure sensitive adhesives (PSA) and hot melt pressure sensitive adhesives (HMPSA), release elements are used to separate adjacent creature control members having PSA or HMPSA as the creature control substance. However, the consumer is left with the arduous and messy task of removing and disposing of each and every release element. Further, use of a release element/barrier has another significant disadvantage. Specifically, the release element tends to dull the finish of the creature control substance when it is removed. In this regard, it is noted that deerflies are attracted to shiny and clear surfaces. Hence, dulling of the creature control substance is counter intuitive to the purpose of creature control members designed to trap deerflies on the control member. Further, many previously known creature control members have a control substance applied to a planar surface. Again, this is disadvantageous as deerflies are attracted to three dimensional surfaces. These are just some of the disadvantages of known creature control members.

OBJECTS AND SUMMARY OF THE INVENTION

An object of a preferred embodiment of the present invention is to provide a novel and unobvious stackable creature control member.

Another object of a preferred embodiment of the present invention is to provide a stacked assembly of a plurality of creature control members having the creature control substance applied to the creature control members where the stacked assembly can be readily packaged, shipped and/or used.

A further object of a preferred embodiment of the present invention is to provide a stacked assembly of a plurality of creature control members having a creature control substance applied to the creature control members where the stacked assembly is free of any type of removable and disposable release liner or other release element separating one creature control member having the creature control substance formed thereon from another creature control member having the creature control substance formed thereon.

Yet another object of a preferred embodiment of the present invention is to provide a stackable creature control member having a three dimensional surface on which the creature control substance is applied.

Another object of a preferred embodiment of the present invention is to provide a stackable creature control member configured to prevent contamination and/or exposure to weather elements of the creature control substance of one or more creature control members in a stacked assembly of creature control members.

A further object of a preferred embodiment of the present invention is to provide a stackable creature control member having one or more obstructions or spacers to facilitate separation of adjacent creature control members.

Still another object of a preferred embodiment of the present invention is to provide a stackable creature control member having one or more obstructions or spacers facilitating separation of adjacent creature control members where the obstructions or spacers are not removed during use of the creature control member.

A further object of a preferred embodiment of the present invention is to provide a stackable creature control member having one or more alignment members for preventing or restricting relative movement of creature control members in a stacked assembly of creature control members.

Still a further object of a preferred embodiment of the present invention is to provide mounting assemblies adapted for mounting a stacked assembly of creature control members on a stationary or moveable object where an individual can readily remove a saturated creature control member from the stacked assembly and expose the creature control substance of the next creature control member without removing any element other than the saturated creature control member.

A further object of a preferred embodiment of the present invention is to provide an aerodynamic, stabilizing and reinforcing member for supporting a single creature control member or a stacked assembly of creature control members.

Another object of a preferred embodiment of the present invention is to provide a stackable creature control member that can be mounted about or adjacent a light, a light fixture or a lightening assembly.

Still another object of a preferred embodiment of the present invention is to provide a stackable creature control member with a plurality of obstructions or spacers which are staggered or offset from a plurality of obstructions or spacers of an adjacent creature control member to facilitate separation of adjacent creature control members where staggering or offsetting is achieved using two or more molds each having a different orientation of obstructions or spacers than the other molds.

Still a further object of a preferred embodiment of the present invention is to provide a stackable creature control member with a plurality of obstructions or spacers which are staggered or offset from a plurality of obstructions or spacers of an adjacent creature control member to facilitate separation of adjacent creature control members where staggering or offsetting is achieved by changing the orientation (e.g., rotating one relative to another) of one creature control member relative to the orientation of an adjacent creature control member.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to an apparatus for trapping insects including a stacked assembly having at least a first insect trap and a second insect trap. The first insect trap is stacked on the second insect trap such that the first insect trap can be readily removed from the second insect trap. The first insect trap includes an exterior surface and an interior surface. The first insect trap has an insect trapping substance on at least a portion of one of the exterior surface and the interior surface of the first insect trap. The insect trapping substance is formed to trap insects on the first insect trap. The second insect trap includes an exterior surface and an interior surface. The second insect trap has an insect trapping substance on at least a portion of one of the exterior surface and the interior surface of the second insect trap. The insect trapping substance is formed to trap insects on the second insect trap wherein the stacked assembly is configured such that removal of the first trap from the second trap exposes the insect trapping substance of the second insect trap without removing any other element.

Another preferred embodiment of the present invention is directed to a method of forming a stacked assembly of creature control members including the steps of: (a) providing a plurality of creature control members each having an exterior surface and an interior surface; (b) coating one of the exterior surface and the interior surface of each of the plurality of creature control members with a creature control substance, the creature control substance being formed to either trap creatures on a corresponding creature control member or repel birds from the corresponding creature control member; (c) providing a plurality of spacer members on a surface of each of the plurality of creature control members having the creature control substance such that the plurality of spacer members create one or more spaces between one creature control member and an adjacent creature control member to facilitate separation of one creature control member from an adjacent creature control member; and, (d) subsequent to the step of paragraph (c), stacking the creature control members one on top of another to form a stacked assembly of creature control members such that when a first creature control member is removed from the stacked assembly the creature control substance of the next creature control member in the stacked assembly is exposed without removal of any element other than the first creature control member.

A further preferred embodiment of the present invention is directed to an apparatus for trapping insects including a stacked insect trap assembly. The stacked assembly includes at least a first insect trap and a second insect trap. The first insect trap is stacked on the second insect trap such that the first insect trap can be readily removed from the second insect trap. Each of the first insect trap and the second insect trap have an insect trapping substance. The insect trapping substance is formed to trap insects on the corresponding insect trap. A mounting assembly for mounting the stacked insect trap assembly in an operating position such that the insect trapping substance of the first insect trap is exposed to trap insects on the first insect trap and the insect trapping substance on the second trap is concealed by only the first insect trap such that upon removal of the first insect trap, the insect trapping substance on the second insect trap is exposed without the removal of any other element. The mounting assembly includes a support member, at least one retaining member for retaining the stacked insect trap assembly on the support member and adjustable mounting means permitting adjustment of a position of the support member relative to a mounting surface.

BRIEF DESCRIPTION OF THE DRAWINGS

FIG. 12A is an enlarged view of portion A of FIG. 12.

FIG. 20A is an enlarged view of portion B of FIG. 20.

FIG. 25A is a perspective view of an alternative mounting assembly for mounting an alternative form of creature control members stacked in an assembly.

FIG. 25B is an enlarged perspective view of portion R of FIG. 25A.

FIG. 25C is an enlarged view of a stacked assembly of creature control members of the type illustrated in FIGS. 25A and 25B.

FIG. 34 is a cross-sectional view taken along lines W-W in FIG. 33.

FIG. 34A is an enlarged view of portion C of FIG. 34.

FIG. 34B is an enlarged view of portion D of FIG. 34.

FIG. 34C is an enlarged view of portion E of FIG. 34.

FIG. 35 is a cross-sectional view taken along lines Y-Y in FIG. 33.

FIG. 35A is an enlarged view of portion F of FIG. 35.

FIG. 36 is a perspective view of another alternative form of creature control member formed in accordance with the present invention.

FIG. 37 is a perspective view of a stacked assembly of two creature control members of the type illustrated in FIG. 36.

DETAILED DESCRIPTION OF THE PREFERRED EMBODIMENTS OF THE INVENTION

The preferred forms of the invention will now be described with reference to FIGS. 1-49. The appended claims are not limited to the preferred forms and no term and/or phrase used herein is to be given a meaning other than its ordinary meaning unless it is expressly stated otherwise.

FIGS. 1 Through 8

Figure 1:
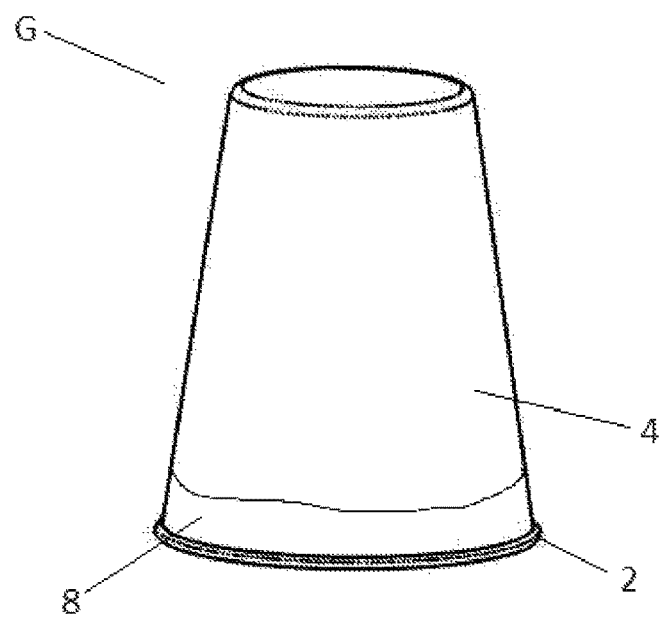
FIG. 1 is a perspective view of a plastic drinking cup having a creature control substance applied to an exterior surface of the cup.
Figure 2:
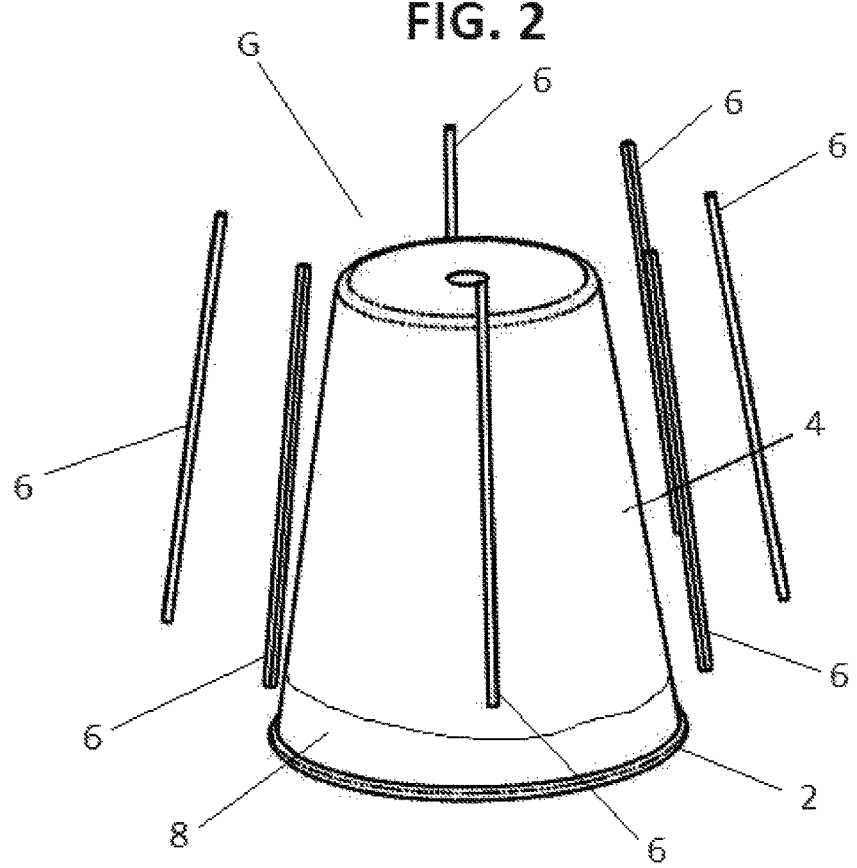
FIG. 2 is an exploded perspective view of a preferred form of a creature control member formed in accordance with the present invention.
Figure 3:
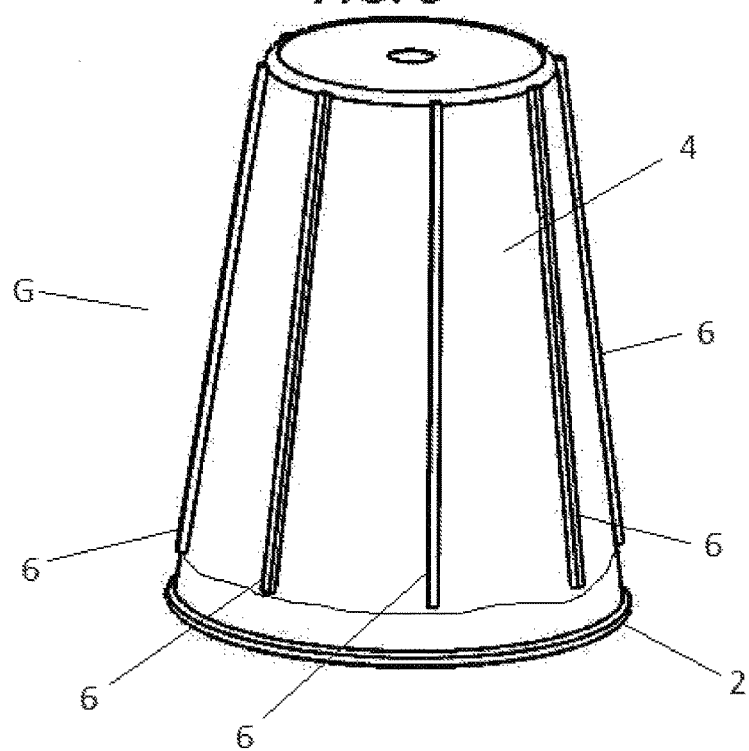
FIG. 3 is a perspective view of the creature control member illustrated in FIG. 2.

Referring to FIGS. 2 to 5, a preferred form of a stackable creature control member G is illustrated in one of many possible configurations. In this embodiment, creature control member G is an insect trap for trapping insects including but not limited to deer flies on creature control member G. FIG. 1 illustrates a partially formed creature control member G where the body 2 of the creature control member G is a plastic thermoformed disposable drinking cup. Body 2 is not limited to a plastic thermoformed disposable drinking cup but rather can take any suitable form. Further, creature control member G need not be disposable. Rather, creature control member can be formed from a material that can be recycled or reconditioned. Further, where the creature control member is protected from the elements (e.g., indoor use), body 2 can be formed from material used to form disposable or recyclable paper products or foam dishware products.

Body 2 can be colored to attract insects. For example, body 2 could be blue or royal blue to attract deer flies. The exterior surface of body 2 is non-planar, i.e., a surface having a plurality of points each of which has a different z-axis coordinate (hereinafter referred to as a three dimensional surface or 3D surface). Z-axis coordinate as used herein is a height coordinate relative to a horizontal plane when the creature control member G lies on the horizontal plane. An insect trapping substance 4 is applied to a major portion of the exterior of body 2. Hence, the insect trapping substance 4 is applied to a three dimensional surface as opposed to a planar surface. Preferably, the lower portion 8 of body 2 is free of insect trapping substance 4 so that an individual can grasp portion 8 to manipulate the creature control member G without coming into contact with the insect trapping substance 4. It should be noted that the stackable creature control member G could have a planar surface to which the insect trapping substance is applied.

Spacer members 6 are partially or completely embedded in the insect trapping substance 4 and are retained on body 2 by the adhesive characteristics of the insect trapping substance 4. Preferably, spacer members 6 are thin STY-ROFOAM® strips. However, spacer members 6 can be formed from any suitable material and can take any suitable shape.

Figure 4:
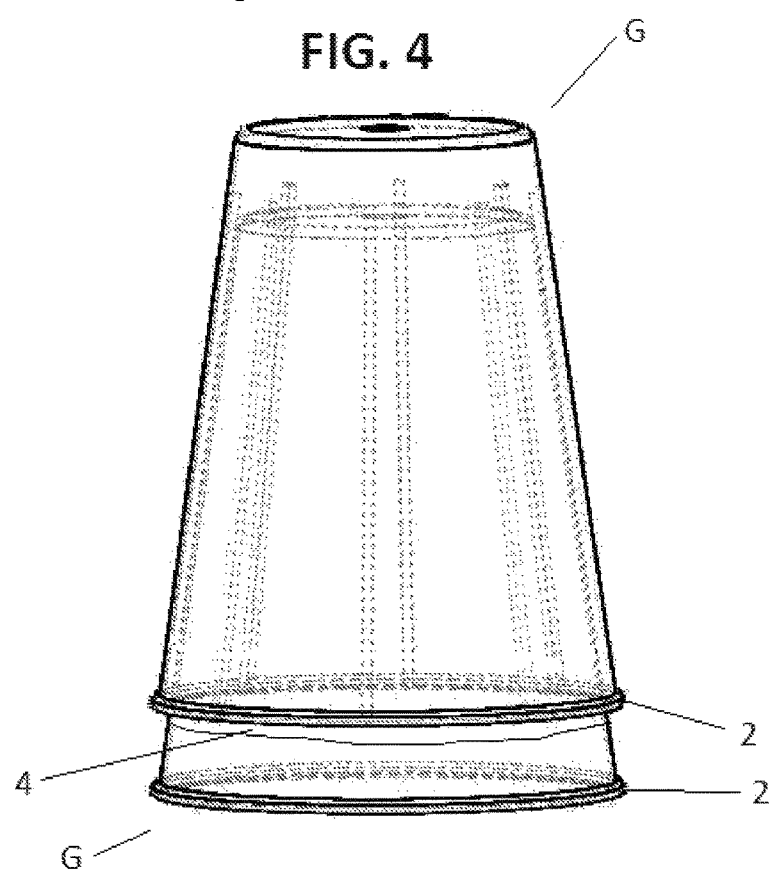
FIG. 4 is a stacked assembly of two creature control members of the type illustrated in FIG. 3.

Spacer members 6 obviate the need for release paper, release liners or other release elements between adjacent creature control members in a stacked assembly having multiple creature control members. Spacer members 6 further obviate the need for application of release agents to the creature control members G. Specifically, spacer members 6 serve to space a lower creature control member G from a creature control member mounted directly on top of the lower creature control member G preventing the insect trapping substance of the lower creature control member G from acting to adhere the lower creature control member G to the creature control member G mounted directly on top of the lower creature control member G. Hence, two or more creature control members G can be stacked one on top of another for packaging, shipping and/or use as seen in FIG. 4. The uppermost element in the stack can be merely body 2 without insect trapping substance 4 or spacer members 6 to facilitate packing and shipping of a stacked assembly of a plurality of creature control members G. Hence, the insect trapping substance may be applied prior to delivery of the stacked assembly of two or more creature control members G to the consumer. Accordingly, the consumer does not need to go through the tedious and messy process of applying insect trapping substances to a trapping device or trapping area. Rather, this preferred embodiment provides the consumer with a ready to use assembly of stacked insect traps each with the insect trapping substance already applied to the insect traps.

Figure 5:
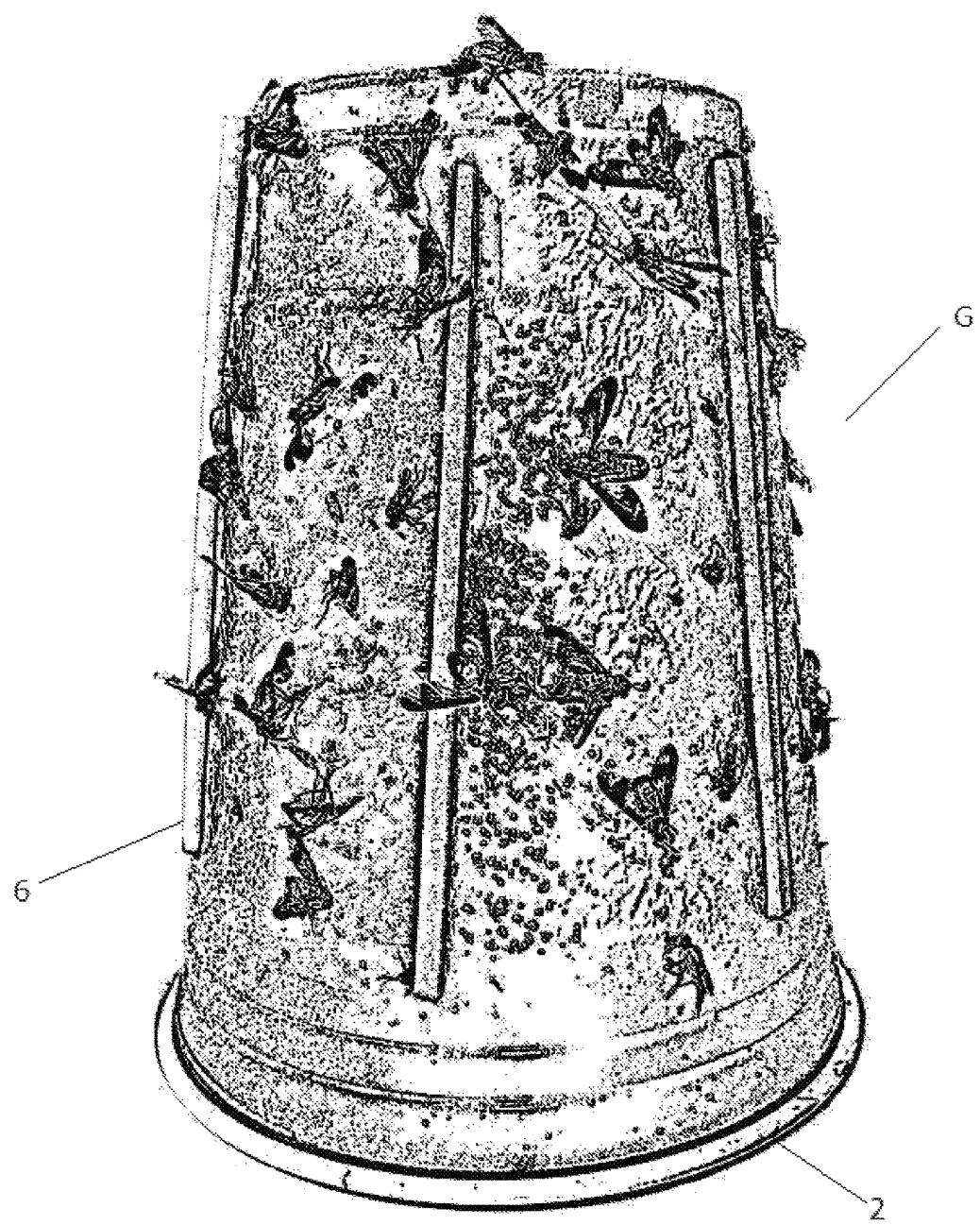
FIG. 5 is a perspective view of the creature control member illustrated in FIG. 3 illustrating insects trapped on the creature control member.

As seen in FIG. 5, spacers 6 are not removed when the creature control member G is used to trap insects directly on the exterior surface of the creature control member G and do not adversely affect the insect trapping function of creature control member G.

When an individual readily and easily removes the uppermost creature control member G from a stacked assembly of a plurality of creature control members G, the next creature control member G is ready for use without removing any release barrier or release element (e.g., release liner or specialized release paper) between the two stacked creature control members G. Hence, an individual does not need to go through the annoying and messy process of removing and disposing of release elements that will necessarily have thereon some insect trapping substance.

Preferably, the insect trapping substance 4 is a low viscosity wet-gel adhesive (LVWGA), petroleum jelly (PJ), or similar petroleum-based substance suitable for trapping insects. It is noted that using LVWGA will allow for some contamination of the insect trapping substance of one creature control member with an adjacent creature control member G without significantly hampering the ease at which stacked creature control members G can be separated. Hence, one or more of spacer members 6 can be completely embedded in the insect trapping substance 4 and yet separation of adjacent creature control members G can be readily and easily achieved. The insect trapping substance 4 may be any other suitable substance including but not limited to higher viscosity pressure sensitive adhesives (PSA) and hot melt pressure sensitive adhesives (HMPSA). Where either PSA or HMPSA is used as the insect trapping substance 4, the spacer members 6 should be formed to prevent contact of the insect trapping substance of one creature control member G from contacting an adjacent creature control member G. For example, spacers 6 can be made of sufficient thickness so that each spacer 6 extends outwardly a sufficient distance from the insect trapping substance 4 to prevent the insect trapping substance 4 of one creature control member G from contacting any portion of an adjacent creature control member G. One suitable insect trapping substance is Tanglefoot bird repellent from Contech Enterprises. Tangle-Trap coating from Contech is also a suitable substance. Other suitable coatings from Contech Enterprises or other manufacturers may be used. It should be noted that if Tanglefoot bird repellent is used creature control member G will trap insects directly in the insect trapping substance 4 as well as repel birds from creature control member G.

Figure 6:
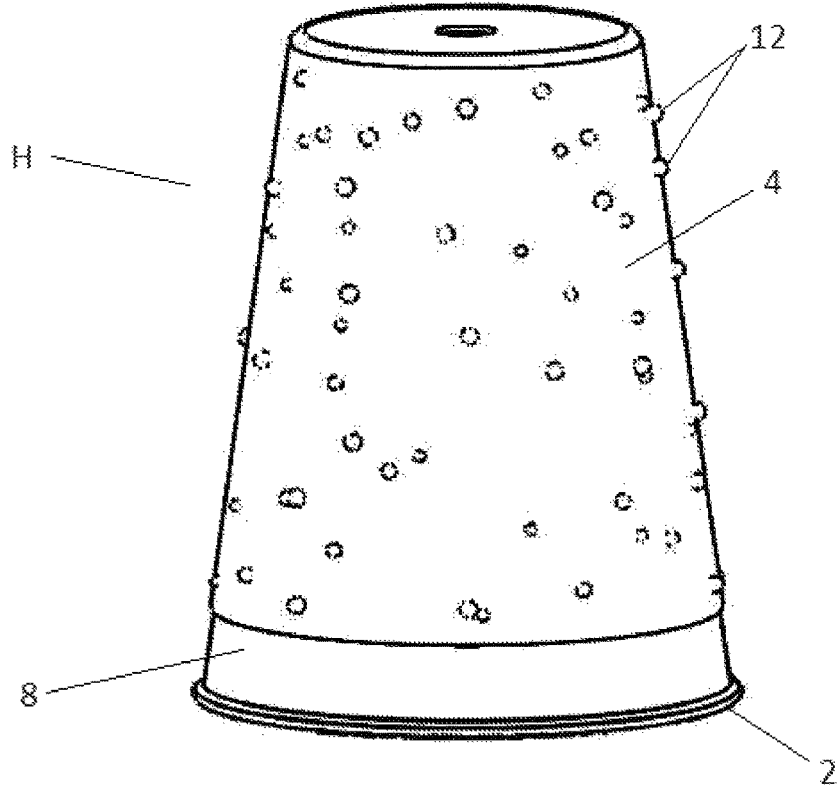
FIG. 6 is perspective view of an alternative form of a creature control member formed in accordance with the present invention.
Figure 7:
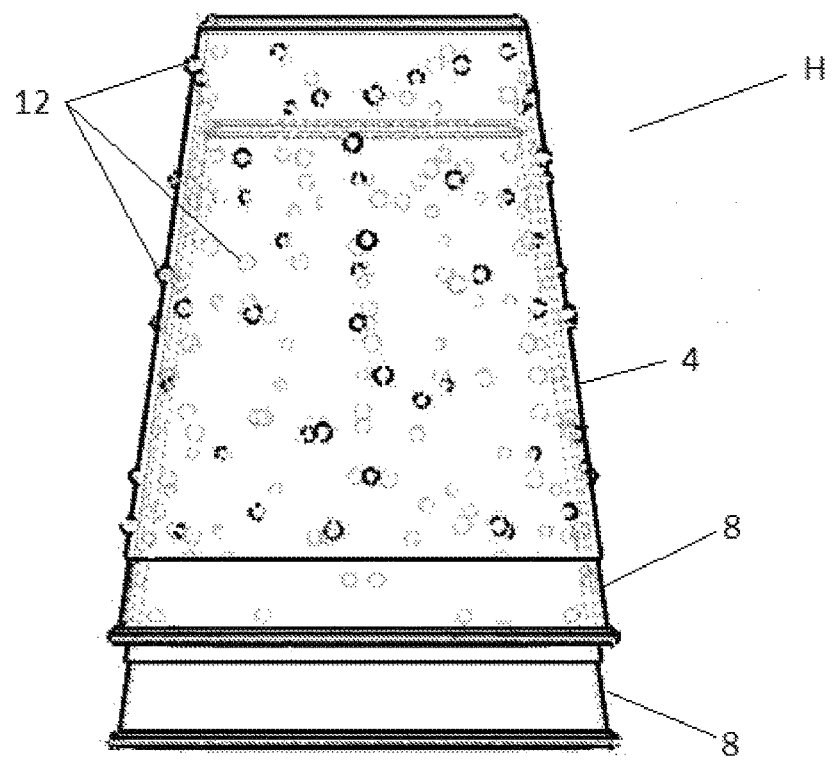
FIG. 7 is a stacked assembly of two creature control members of the type illustrated in FIG. 6.

Referring to FIG. 6, a stackable creature control member H is illustrated in one of many possible configurations. Creature control member H is similar to creature control member G and, therefore, only the differences will be described. Spacers 12 are beads that are partially or completely embedded in the insect trapping substance 4 depending upon the nature of the insect trapping substance used. Spacers 12 function in a similar manner to spacers 6. Again, where LVWGA is used as the insect trapping substance, spacers 12 can be completely embedded in the insect trapping substance 4. Where PSA or HMPSA is used as the insect trapping substance 4, spacers 12 should be formed to prevent contact of the insect trapping substance of one creature control member H from contacting an adjacent creature control member H. Beads 12 can be formed of any suitable material including but not limited to an expanded plastic made from polystyrene (e.g. STYROFOAM®). Beads 12 allow for stacking of numerous creature control members H one on top of the other as shown in FIG. 7.

Figure 8:
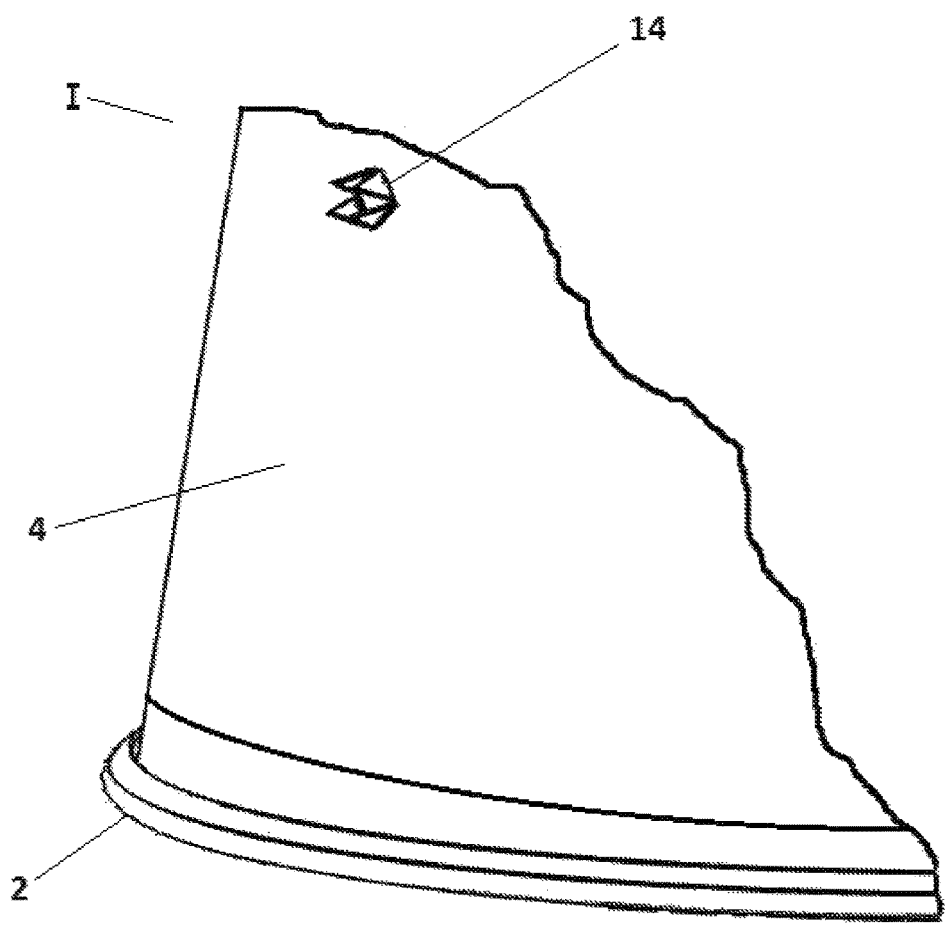
FIG. 8 is a fragmentary perspective view of another alternative form of creature control member formed in accordance with the present invention.
Figure 9:
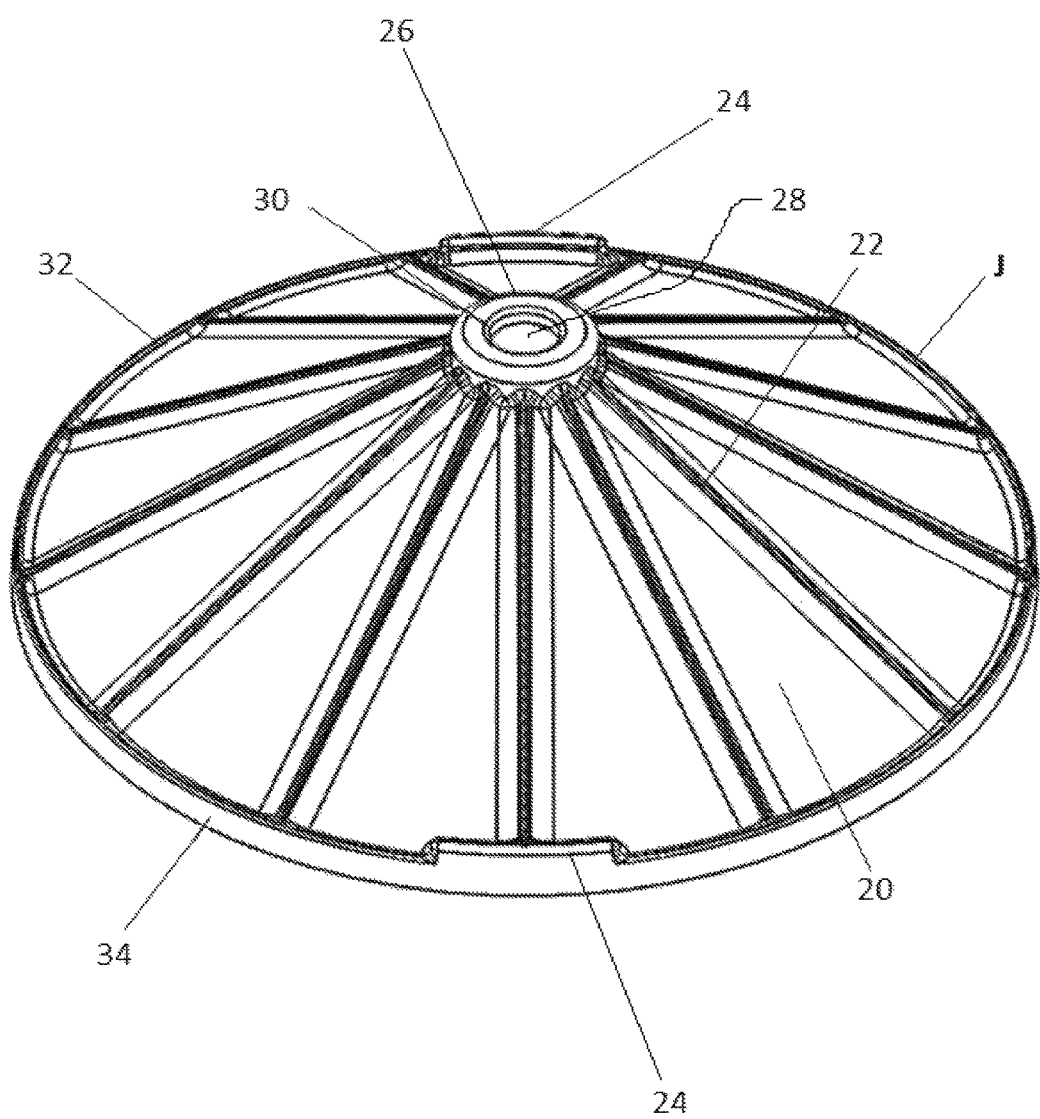
FIG. 9 is perspective view of another alternative form of a creature control member formed in accordance with the present invention for pole mounting.
Figure 10:
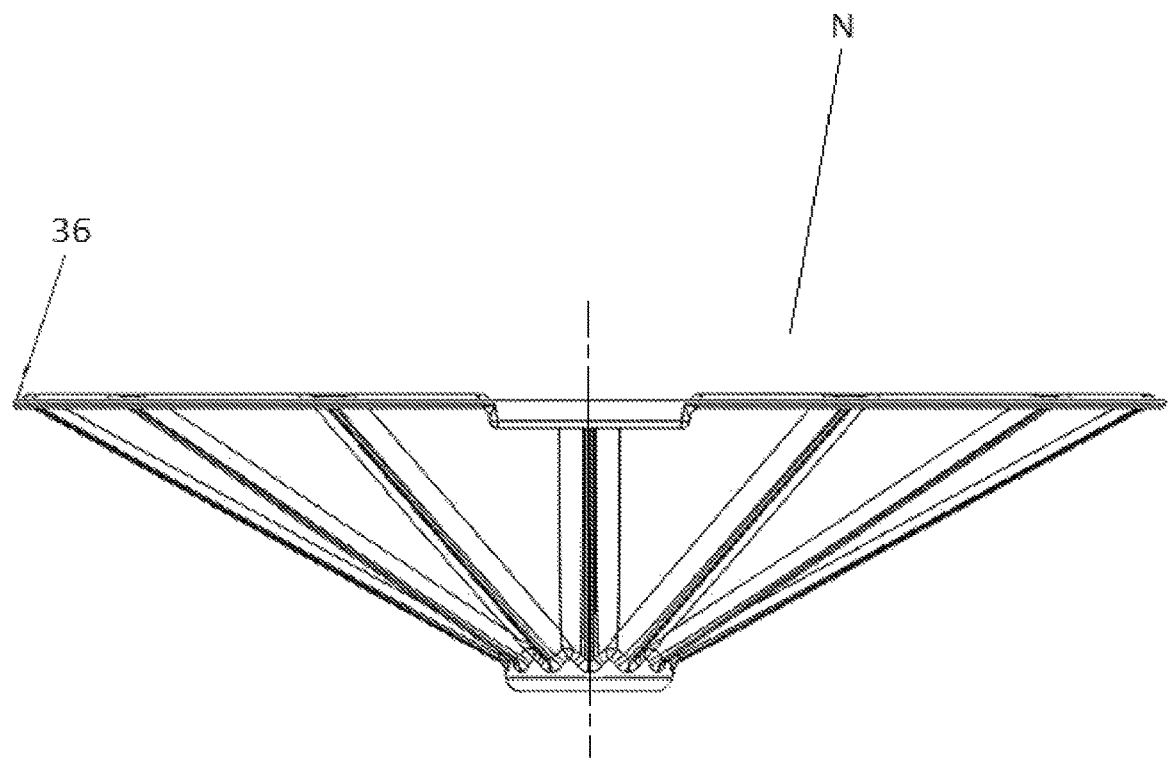
FIG. 10 is a perspective view of a preferred form of aerodynamic, stabilizing and reinforcing member for supporting a single creature control member or a stacked assembly of creature control members of the type illustrated in FIG. 9.
Figure 11:
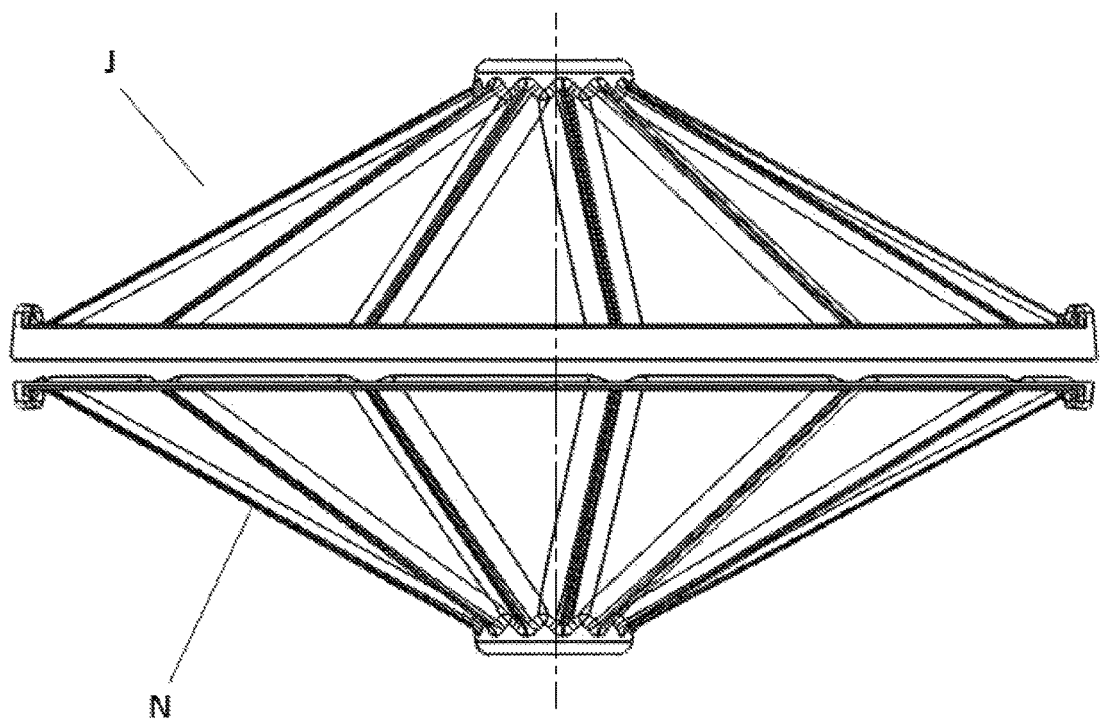
FIG. 11 is an exploded view of the creature control member of the type illustrated in FIG. 9 just prior to mounting on the aerodynamic, stabilizing and reinforcing member illustrated in FIG. 10.

Referring to FIG. 8, a stackable creature control member I is illustrated in one of many possible configurations. Creature control member I is similar to creature control member G and, therefore, only the differences will be described. Spacers 14 are punch outs or breakaway sections formed in body 2 and function in a similar manner to spacers 6 and 12.

FIGS. 9 Through 25

Referring to FIGS. 9 to 25, another preferred form of a stackable creature control member J will now be described in connection with a preferred low-profile mounting assembly K and preferred high-profile mounting assemblies L and M. The low-profile mounting assembly K is depicted in FIGS. 16 to 18, 21, 22 and 24. High-profile mounting assembly L is depicted in FIGS. 12, 13, 19, 20, 20A and 21 to 24. High-profile mounting assembly M is depicted in FIG. 25. High-profile mounting assemblies L and M preferably utilize an aerodynamic, stabilizing and reinforcing member N to support and protect one or more stackable creature control members J. In this embodiment, creature control member J is an insect trap for trapping insects including but not limited to deer flies directly on creature control member J. Stackable creature control member J can be blue or royal blue to attract and trap deer flies directly on control member J. However, this embodiment is not limited to blue or royal blue. Rather, other colors may be utilized as desired. Further, other insect attractants other than color may be utilized in connection with stackable creature control member J including but not limited to lights, light diffusing members, light reflecting members and light transmitting members. For example, stackable creature control member J could be transparent and mounted about a green LED light to attract and trap culicoides. Alternatively, stackable creature control member J could be strategically located adjacent a green LED light to attract and trap culicoides. Preferably, stackable creature control member J is formed as a single piece from disposable thermoformed plastic. Suitable materials for stackable creature control member J include but are not limited to polyethylene terephthalate (pet), polyurethane or similar recyclable material, Although this embodiment is generally cone shaped other configurations could also have been utilized applying the same or similar obstructing features facilitating separation of stacked creature control members J. For example, stackable creature control member J could be spherical, shaped like stackable creature control member G, or take the shape of a flowerpot.

LVWGAs or PJ can be applied to only the conical surfaces 20 extending between adjacent structural ribs or projections 22 to trap insects directly on conical surfaces 20. Alternatively, LVWGAs or PJ can be applied to both the conical surface 20 and radially extending obstructing/structural ribs or projections 22. Alternatively, PSAs or HMPSAs can be used as the insect trapping substance. Where PSAs or HMPSAs are used as the insect trapping substance, such insect trapping substance should be applied only on the thirteen conical surfaces 20 to ensure that the insect trapping substance of a lower creature control member J does not come into contact with a creature control member J mounted directly on top of the lower creature control member J.

Figure 15:
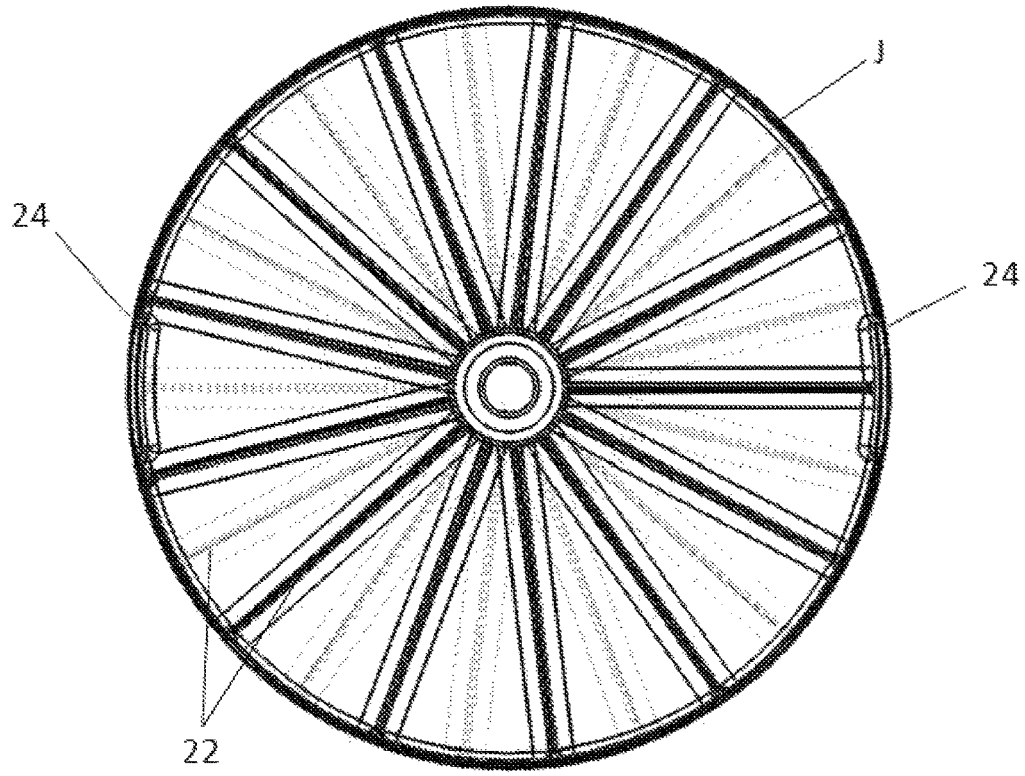
FIG. 15 is a plan view of two creature control members of the type illustrated in FIG. 9 one mounted on top of another with the dashed lines illustrating the staggering of the spacer members of the lower creature control member from the spacer members of the upper creature control member

Ribs 22 in this embodiment are hollow and equally spaced. Hence, if one creature control member J is stacked on top of another creature control member J in the same orientation, ribs 22 of the lower creature control member J could extend into the hollow cavity of the corresponding ribs and contact the interior surface of the corresponding hollow ribs of the upper creature control member J. This could hamper separation of one creature control member J from a directly adjacent creature control member J. To avoid this potential separation issue, this embodiment utilizes an odd number of ribs 22. In this embodiment thirteen ribs 22 are present. However, the number and configuration of the ribs may be readily varied as desired. By rotating 180 degrees one creature control member J from a directly adjacent creature control member J, ribs 22 of a lower creature control member J are not aligned with ribs 22 of a creature control member J stacked directly on top of the lower creature control member J as seen in FIG. 15. It should be noted that staggering of ribs 22 of adjacent creature control members J can be achieved in numerous different ways. For example, two different molds can be used for forming creature control members J to prevent alignment of the ribs of adjacent stacked creature control members J. One mold could vary the orientation and/or the number of the ribs from the orientation and/or number of the ribs in the other mold to prevent alignment of the ribs of adjacent stacked creature control members J.

Preferably, two alignment or anti-rotation members 24 are located 180° about the centerline of creature control member J. Members 24 are preferably hollow and when stacked members 24 of a lower creature control member J extend into the hollow cavity of the corresponding member 24 of a creature control member J stacked directly on top of the lower creature control member J preventing rotation of one creature control member J relative to the other creature control member J. It should be noted that the number and configuration of members 24 can be readily varied as desired. For example, members 24 could be hollow pins, dimples or other structures that act to prevent relative rotation between adjacent creature control members J.

A center hub 26 has an opening 28 for receiving a portion of a mounting assembly. Center hub 26 may have a draft angle 30 to facilitate mold release and/or act to maintain a desired spacing between portions of adjacent creature control members J. Creature control member J includes a circumferentially extending rib 32 which provides structural stability and functions as a gutter to prevent trapped insects from sliding off of creature control member J. Creature control member J further preferably includes a skirt 34. Skirt 34 acts to seal the space between adjacent creature control members J to prevent or restrict airflow between adjacent creature control members J as well as prevent dust or other particle contamination of the insect trapping substance of lower adjacent creature control members J. Skirt 34 may have a draft angle to facilitate mold release and/or act to maintain a desired spacing between portions of adjacent creature control members J.

Preferably, hub 26, alignment member 24, gutter 32 and skirt 34 are free of insect trapping substance. An uppermost creature control member J in a stacked assembly of a plurality of creature control members J can be entirely free of insect trapping substance to act as a cover for protecting the stack assembly of creature control members J when packaged. This embodiment also obviates the need for any release element or release agent. Rather, with only the removal of each creature control member J from a stacked assembly, the insect trapping substance of the next creature control member J in the stacked assembly is exposed for use. Hence, the consumer is spared the arduous and messy process of removing release liners and disposing of the same. Further, because the insect trapping substance is preferably pre-applied to creature control member J prior to purchase, the consumer is spared the time consuming and messy process of applying an insect trapping substance to a trap or trapping area.

Figure 12:
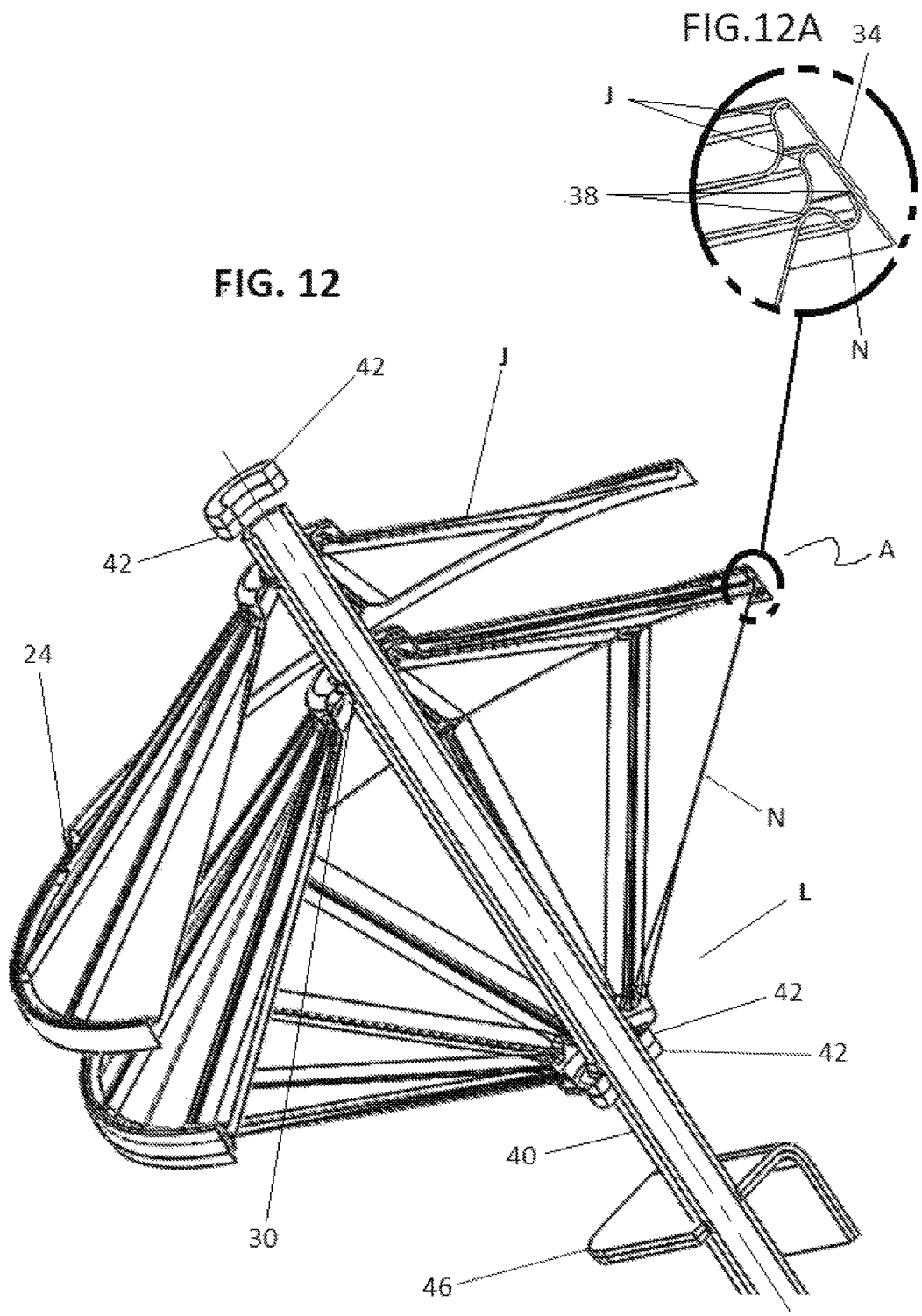
FIG. 12 is a fragmentary, exploded, sectional view of a preferred pole mounting assembly for mounting a stacked assembly of creature control members of the type illustrated in FIG. 9 utilizing the aerodynamic stabilizing and reinforcing member illustrated in FIG. 10.
Figure 13:
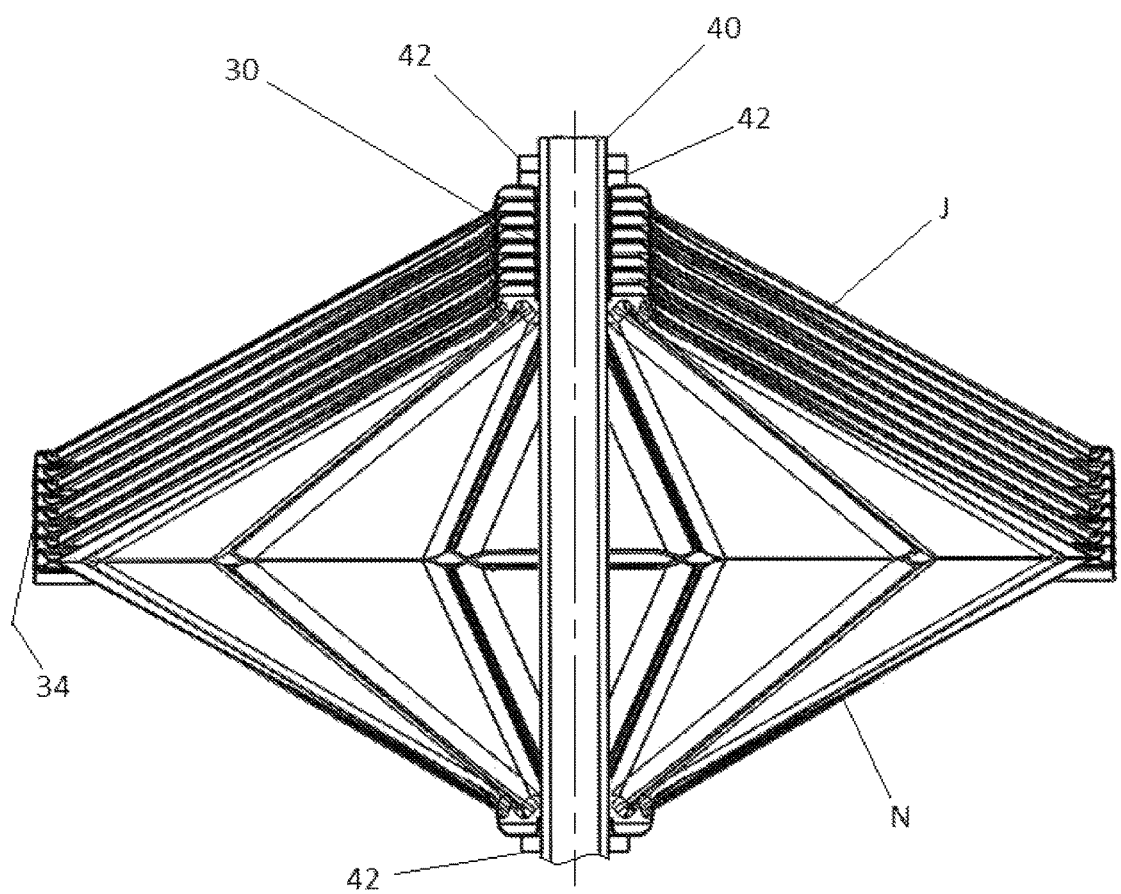
FIG. 13 is a cross-sectional view taken through the center of a pole mounted stacked assembly of creature control members of the type illustrated in FIG. 9 positioned on the aerodynamic, stabilizing and reinforcing member illustrated in FIG. 10.
Figure 14:
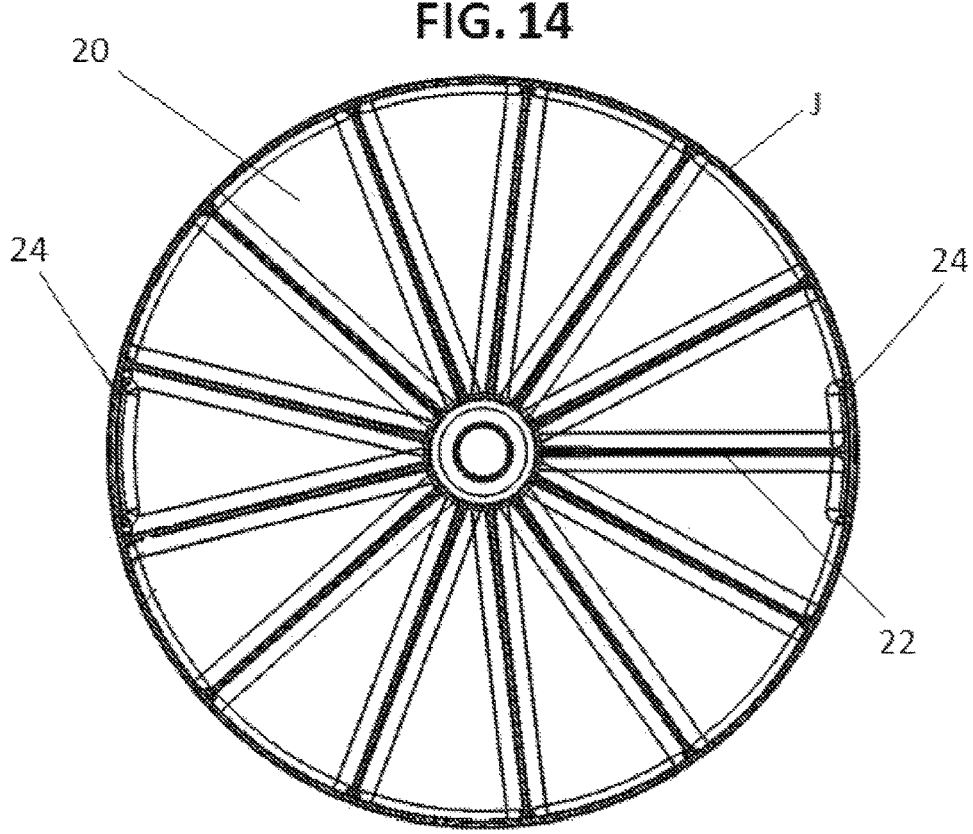
FIG. 14 is a plan view of the creature control member of the type illustrated in FIG. 9.

Referring to FIGS. 10, 11, 12, 12A, 13 and 20 to 25 an optional aerodynamic, stabilizing and reinforcing member N is illustrated. Member N functions to reinforce, stabilize and support a stacked assembly of creature control members J when mounted on a mounting assembly. Member N also acts as an aerodynamic skirt. Member N can be formed to have the same configuration as creature control member J. Further, member N can be formed from the same material as creature control member J. However, skirt 36 of member N is preferably formed to be shorter than skirt 34 of creature control member J as seen in FIGS. 10, 11, 12 and 12A. By sizing skirt 36 in this manner, skirt 36 readily and easily nests in the hollow cavity of skirt 34 of the creature control member J mounted directly on top of member N as clearly seen in FIG. 12A. As seen in FIG. 12A, member N has two points of contact 38 with creature control member J mounted directly on member N. Member N can be rotated arbitrarily relative to the stacked assembly of creature control members J as the inverted orientation of member N relative to stacked assembly of creature control members J prevents any interlocking issue of the ribs of member N with the ribs of creature control members J.

Referring to FIGS. 12, 13, 19, 20, 20A, 21, 22, 23 and 24, high-profile mounting assembly L includes a support shaft or pole 40, four O-rings 42, mounting brackets 44 and 46 and attachment members 48. As seen in FIGS. 12, 13, 21, 22, 23 and 24, shaft or pole 40 extends through center hub 26 of each of creature control members J as well as the center hub of member N. A pair of O-rings 42 positioned above and below the stacked assembly of creature control members J and member N maintain the stacked assembly in a desired position on shaft 40. Although this embodiment depicts four O-rings 42 (two above and two below) locating the stacked assembly on shaft 40, the number of O-rings can vary depending on application requirements. Shaft 40 may be formed from any suitable material including flexible PVC or PEX tubing or similar lightweight material. O-rings 42 may be formed from rubber, PVC, or any other form of material that can elastically grasp shaft 40 and maintain the stacked assembly in a desired location while ensuring snug contact between adjacent creature control members J and snug contact between the lowermost creature control member J and member N. Numerous other options can be utilized other than O-rings to perform the functions described above. For example, the lower O-rings could be replaced with numerous layers of tape wrapped around shaft 40 or a cotter pin with a hole drilled through shaft 40. By ensuring snug contact between adjacent creature control members J and snug contact between the lowermost creature control member J and member N, the draft angles of skirt 34 and center hub 26 serve to protect the insect trapping substance from contamination and weather elements including but not limited to wind and rain. By adjusting the draft angles of skirt 34 and center hub 26, the spacing between portions of adjacent creature control members J can be varied to prevent or permit contact of a portion of creature control member J with the insect trapping substance on an adjacent creature control member J. Because the high-profile mounting assembly L may encounter high velocity winds (for example when mounted on a truck or other vehicle), the protection afforded by skirt 34 and center hub 26 can be extremely beneficial.

Preferably, brackets 44 and 46 are L-shaped and are formed from a flexible material allowing for the internal angle formed by the two legs of each bracket to be varied as desired. Brackets 44 and 46 each have a central opening 50 for receiving shaft 40. Openings 50 are sized relative to shaft 40 to create an interference fit or force fit preventing brackets 44 and 46 from inadvertently moving along shaft 40 once positioned in a desired location on shaft 40. However, any suitable fastening means may be used to secure brackets 44 and 46 on shaft 40 while permitting position adjustment thereof when desired.

Brackets 44 and 46 are similar but not identical. Specifically, bottom leg 52 of bracket 44 has a length greater than the bottom leg 54 of bracket 46. Further, opening 50 formed in leg 52 is spaced a greater distance from upper leg 56 of bracket 44 than opening 50 in bottom leg 54 is spaced from upper leg 60 of bracket 46.

Because some applications require additional strength, shock resistance and it's tested ability to attach to the rear of most tractors and farm implements attachment members 48 are preferably 3M's Dual Lock™ fasteners. However, many different attachment means can be used to fasten brackets 44 and 46 to a mounting surface. For example, in low stress applications hook and loop fasteners or a high quality double-sided tape may also be suitable. Further, screws, bolts, magnets, suction cups or other suitable fasteners may be used to attach brackets 44 and 46 to a mounting surface.

Brackets 44 and 46 can be made of durable conveyer belt material primarily PVC which is heated and then folded into shape. However any durable, pliable, flexible materials compatible with the attachment members 48 may be used to form brackets 44 and 46.

The benefits of high profile mounting assembly L include its fast installation and its tremendous adjustability. The position of the stacked assembly of creature control members J and member N on shaft 40 can be readily adjusted by repositioning the O-rings. Further, shaft 40 and brackets 44 and 46 are each flexible and bendable permitting adjustment of the mounting assembly L by the consumer. Further, due to the interference or force fit between brackets 44 and 46 the position of these brackets along shaft 40 can be readily varied. The consumer is provided with a number of installation variables by which to adjust mounting assembly L before or after the stacked assembly of creature control members J and member N are mounted on shaft 40 based on consumer preference and the particular application. These installation variables include: (i) angularity of shaft 40 controlled by the distance between brackets 44 and 46 (in some instances it may be desirable to maintain a minimum distance between brackets, e.g. five inches); (ii) angularity of shaft 40 controlled by changing which of the brackets is located above the other bracket (see FIG. 21 where bracket 46 is located above bracket 44 and FIG. 23 where bracket 44 is located above bracket 46); (iii) angularity of shaft 40 controlled by inverting one or both brackets 180 degrees (i.e., flipping upside down) from the orientation shown in FIG. 19; (iv) position of stacked assembly controlled by sliding shaft 40 up or down relative to brackets 44 and 46; and (v) position of stacked assembly controlled by bending shaft 40.

Figure 16:
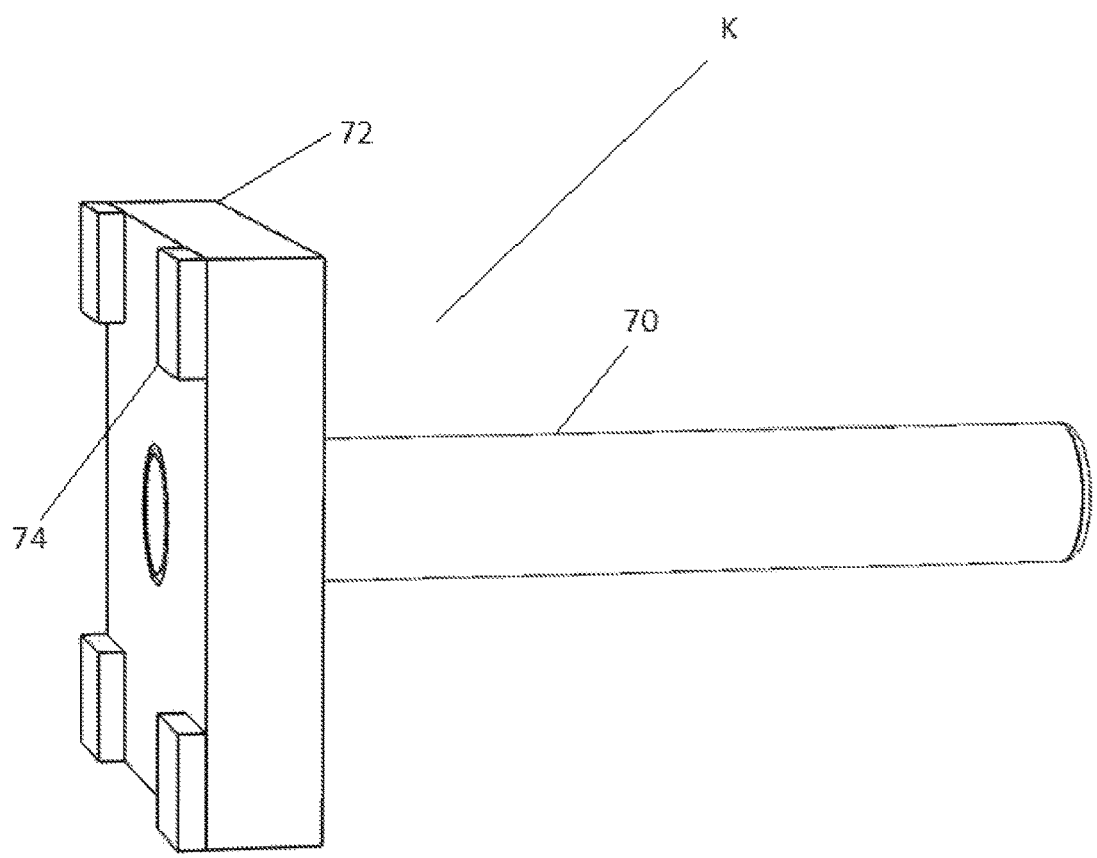
FIG. 16 is a perspective view of a preferred low profile mounting assembly for mounting at a desired location a stacked assembly of creature control members.
Figure 17:
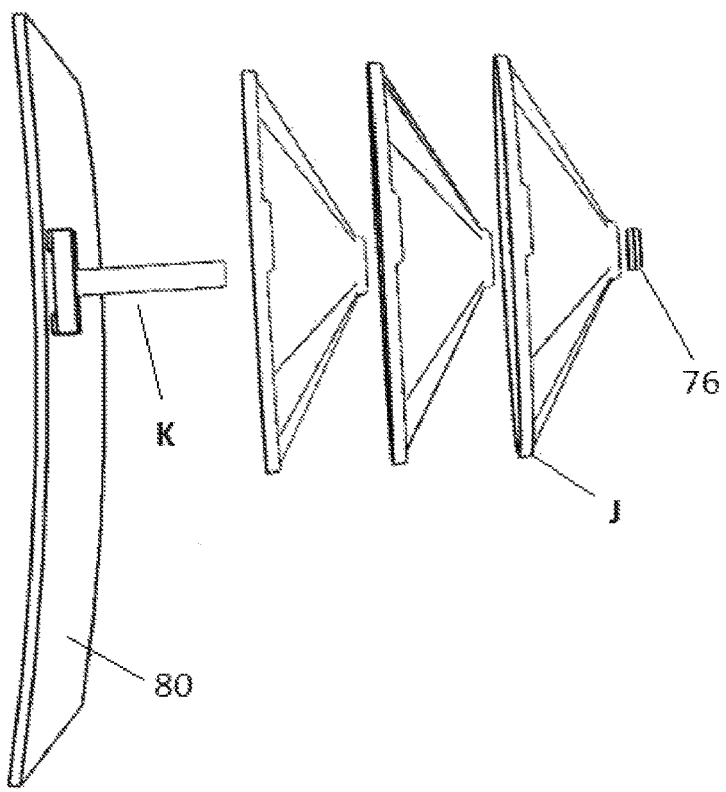
FIG. 17 is an exploded perspective view of the low profile mounting assembly mounting a stacked assembly of creature control members on the window of a vehicle.
Figure 18:
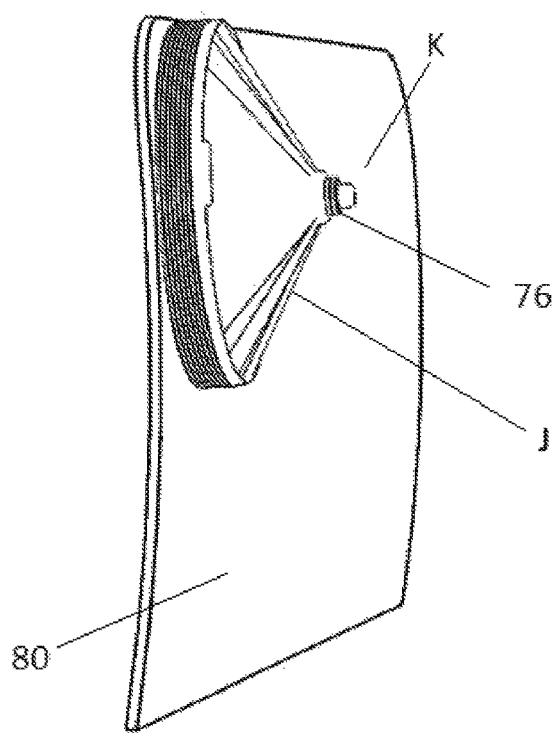
FIG. 18 is a perspective view of the low profile mounting assembly mounting a stacked assembly of creature control members in an operating position on the window of a vehicle.
Figure 19:
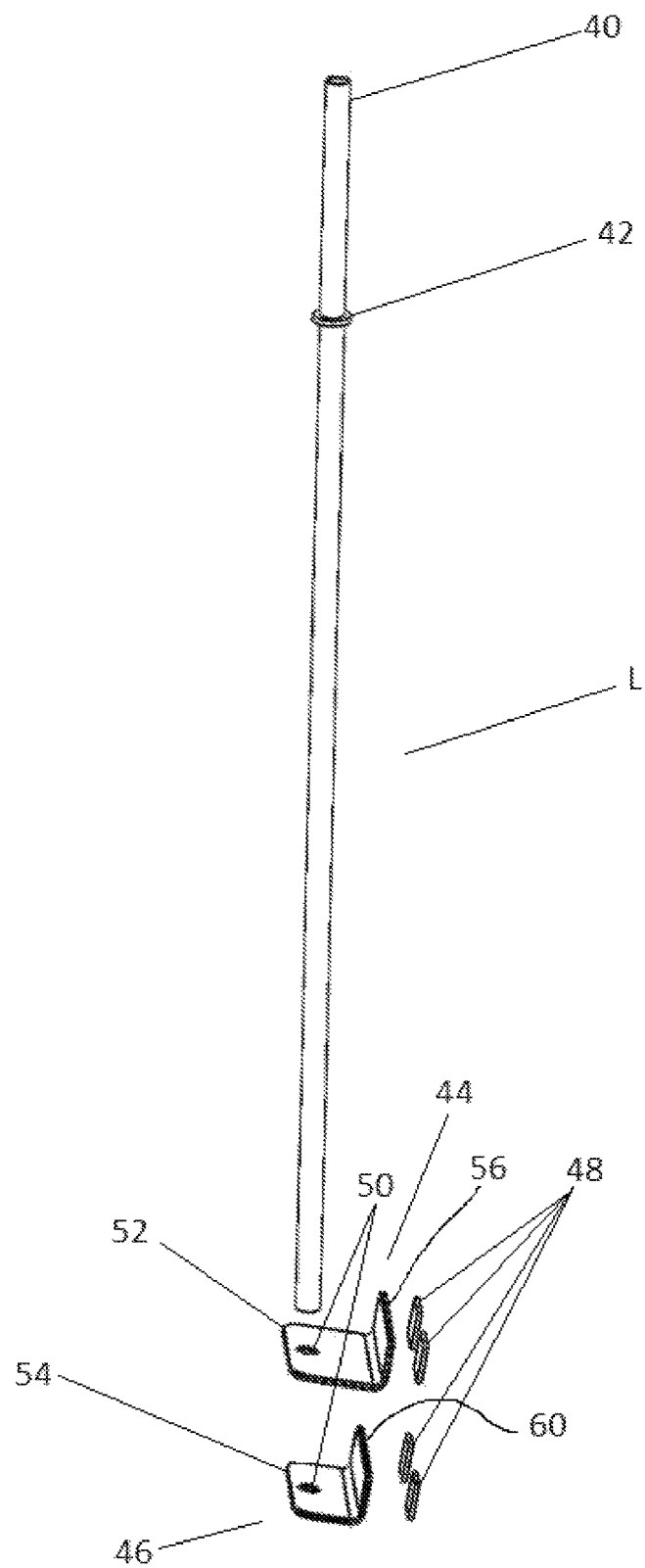
FIG. 19 is an exploded perspective view of a preferred high profile mounting assembly for mounting at a desired location a stacked assembly of creature control members.
Figure 20:
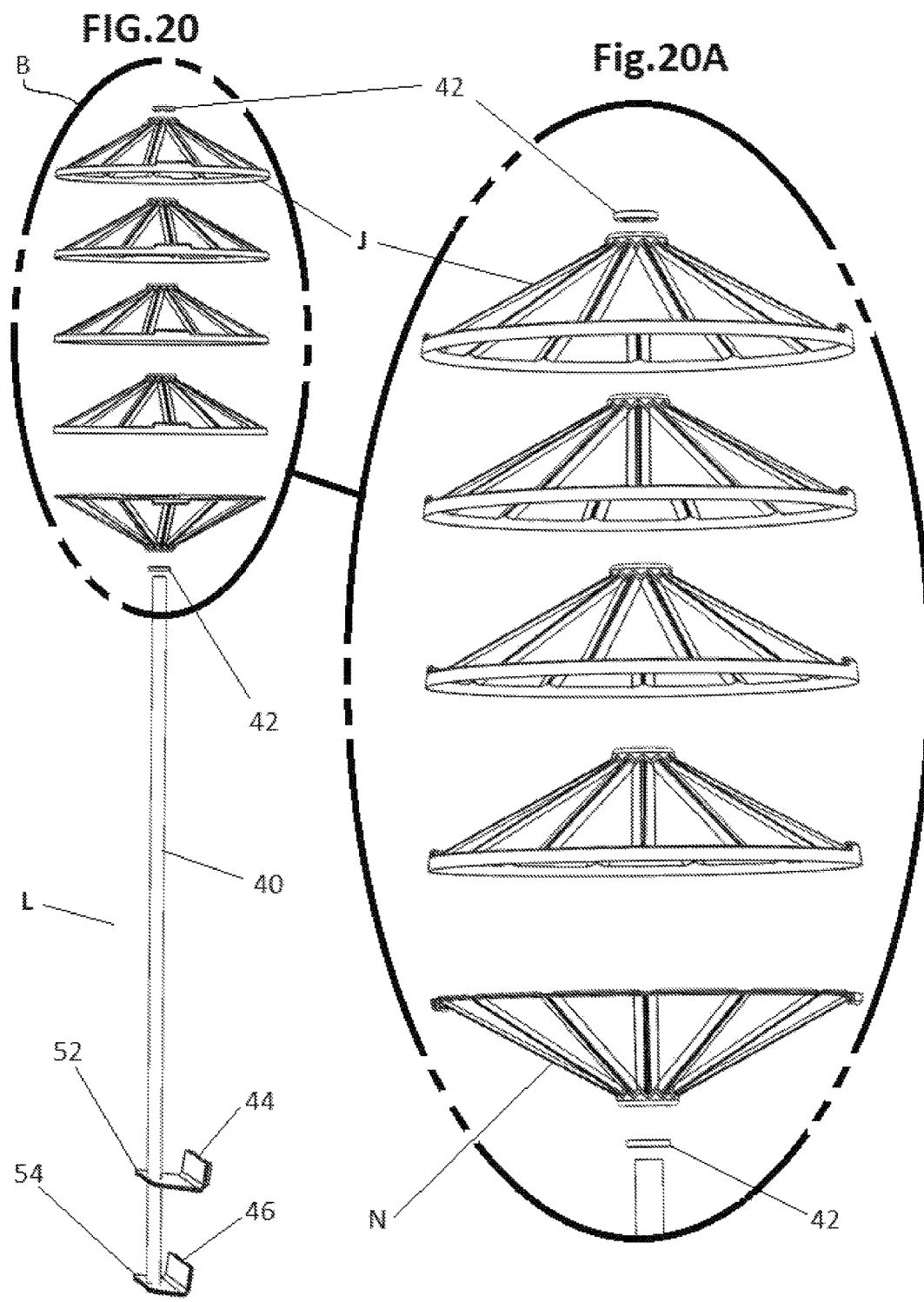
FIG. 20 is an exploded view of a high profile mounting assembly, a stacked assembly of creature control members of the type illustrated in FIG. 9 and an aerodynamic, stabilizing and reinforcing member of the type illustrated in FIG. 10.

Referring to FIGS. 16 to 18, low-profile mounting assembly K is designed to receive and support a stacked assembly of creature control members J without member N. Low-profile mounting assembly K includes a shaft or pole 70 extending from base 72 having four attachment members 74 preferably positioned at each of the four corners of the lower surface of base 72. One or more O-rings 76 are preferably used to securely position the stacked assembly of creature control members J on shaft 70. However, as explained in connection mounting assembly L, numerous other fastening devices may be used to secure the stacked assembly on shaft 70.

Shaft 70 is preferably rigid or semi-rigid and can have the same diameter as shaft 40 so that creature control members J can be interchangeably used on either mounting assembly K or mounting assembly L. Attachments members 74 may be the same as attachment members 48.

Mounting assembly K provides a very simple, inexpensive and very aerodynamic mounting for a stacked assembly of creature control members J. Mounting assembly K is particularly advantageous when mounted on vehicles (e.g., rear windows of passenger cars). This embodiment or a similar embodiment may also be feasible for mounting to the front windscreen of large trucks outside of the windshield wiper pattern. Shaft 70 and base 72 may be formed as two separate pieces or as a single piece. While this embodiment shows the use of four double-sided attachment members 74, the number and type of attachment members may be varied as desired. FIGS. 17 and 18 illustrate a stacked assembly of creature control members J mounted to rear window 80 of a truck using the low-profile mounting assembly K. Where the mounting assembly orients the creature control member in a manner other than horizontal, the insect trapping substance may be chosen to prevent the insect trapping substance from running off the creature control member. For example, due to the vertical orientation of creature control member J in FIG. 18, it may be desirable to choose PSAs or HMPSAs as the insect trapping substance to prevent run off.

Figure 21:
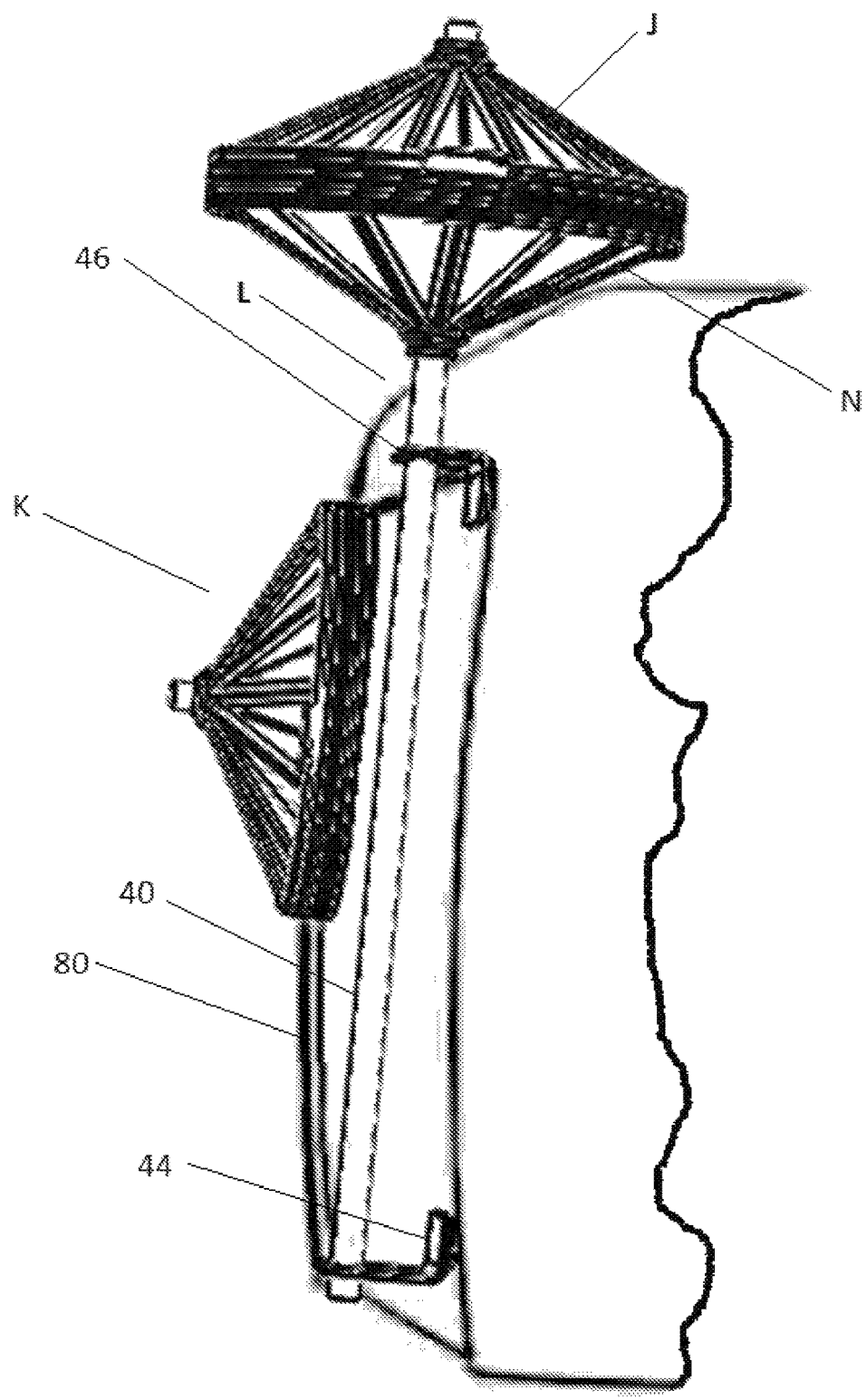
FIG. 21 is a fragmentary perspective view of the low profile mounting assembly with a stacked assembly of creature control members of the type illustrated in FIG. 9 and the high profile mounting assembly with a stacked assembly of creature control members of the type illustrated in FIG. 9 and an aerodynamic, stabilizing and reinforcing member of the type illustrated in FIG. 10. Each mounting assembly is attached to a rear window of a vehicle.
Figure 22:
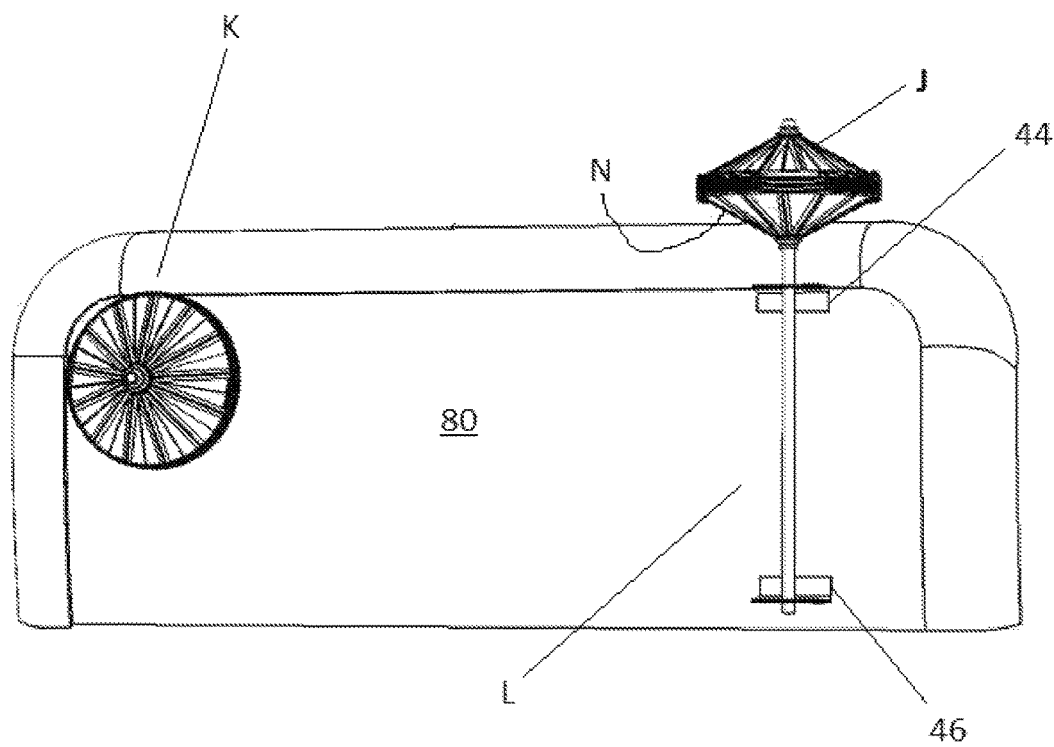
FIG. 22 is a fragmentary perspective view of the embodiment illustrated in FIG. 21 taken from an oblique rear vantage point.
Figure 23:
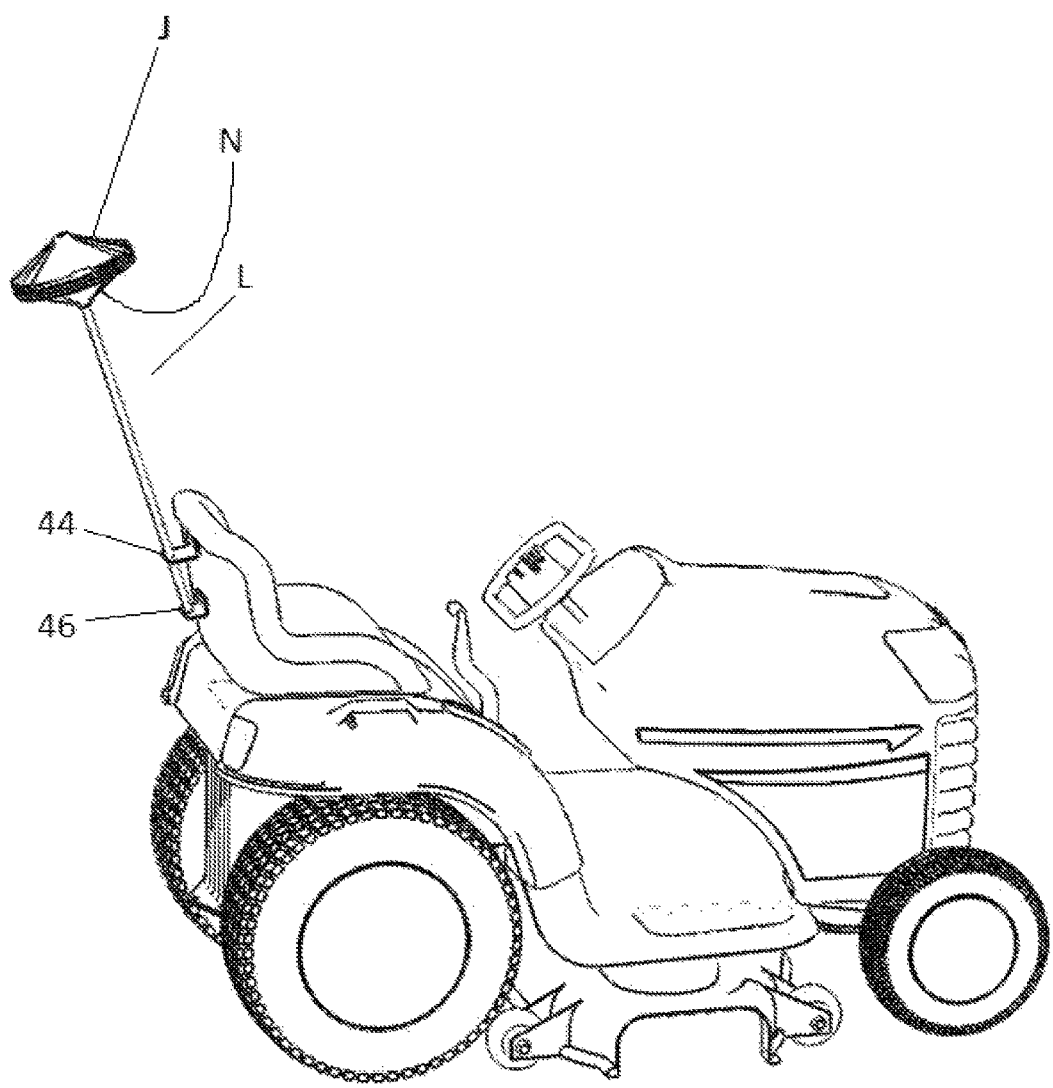
FIG. 23 is a perspective of view the high profile mounting assembly with a stacked assembly of creature control members of the type illustrated in FIG. 9 and an aerodynamic, stabilizing and reinforcing member of the type illustrated in FIG. 10 mounted on the backrest of a riding lawn mower.

FIGS. 21 and 22 illustrate a pair of stacked assemblies of creature control members J mounted to rear window 80 of a truck using low-profile mounting assembly K and high-profile mounting assembly L. Notably, member N is utilized in connection with the high-profile mounting assembly L to support and reinforce the creature control members J. Member N also functions as an aerodynamic skirt. FIG. 23 illustrates a stacked assembly of creature control members J mounted to a backrest of a riding mower using high-profile mounting assembly L and member N. Again, member N serves to support and reinforce creature control members J as well as function as an aerodynamic skirt. It should be noted that an assembly of stacked creature control members J supported on member N can be mounted on any portion of a riding lawn mower or any implement (e.g. lawn vacuums, hauling trailers, cultivators, aerators, tillers, etc.) that may be attached to the riding lawn mower.

Figure 24:
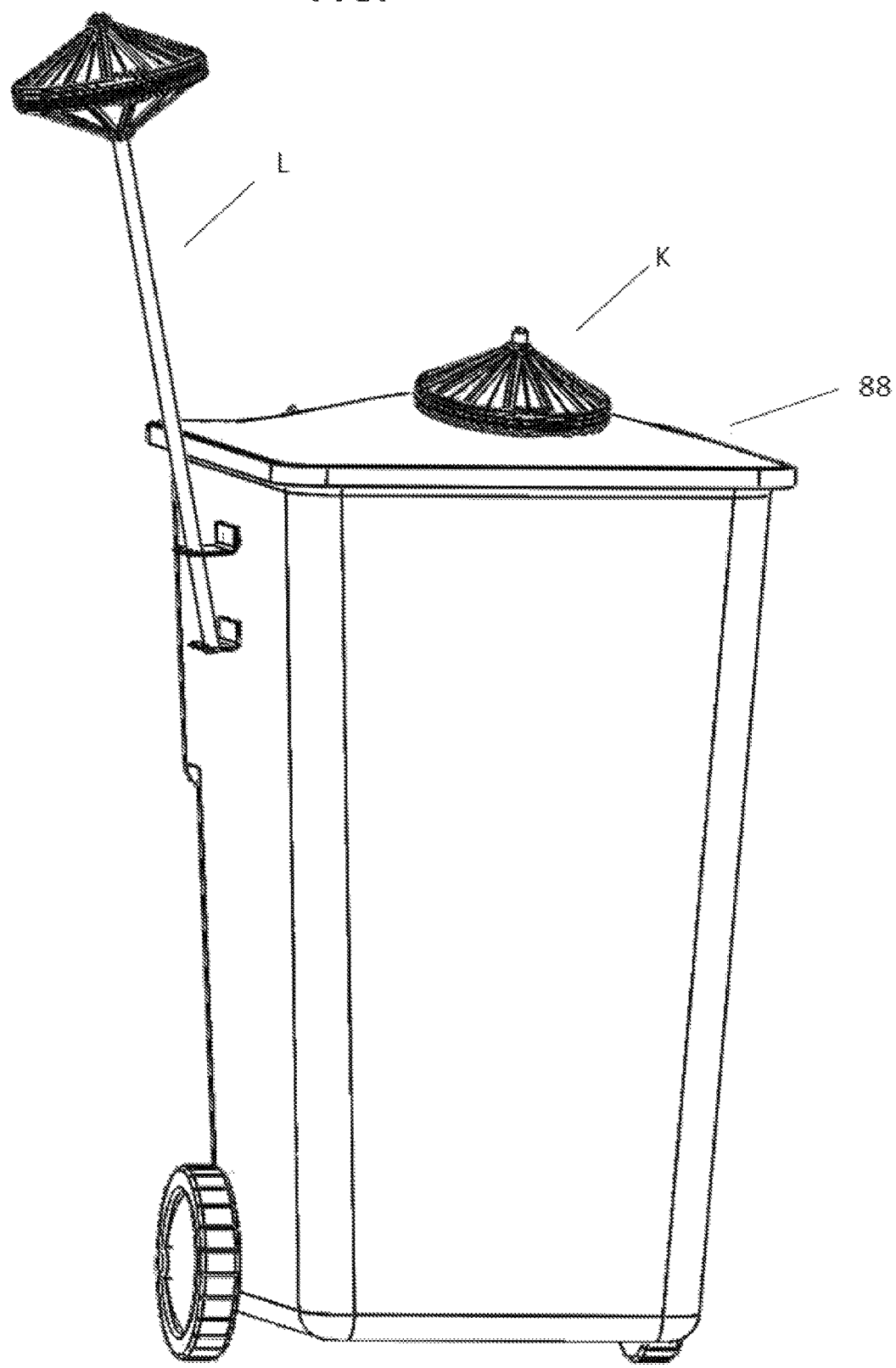
FIG. 24 is a perspective view of the low profile mounting assembly with a stacked assembly of creature control members of the type illustrated in FIG. 9 and the high profile mounting assembly with a stacked assembly of creature control members of the type illustrated in FIG. 9 and an aerodynamic, stabilizing and reinforcing member of the type illustrated in FIG. 10. Each mounting assembly is attached to a garbage or recycling receptacle.
Figure 25:
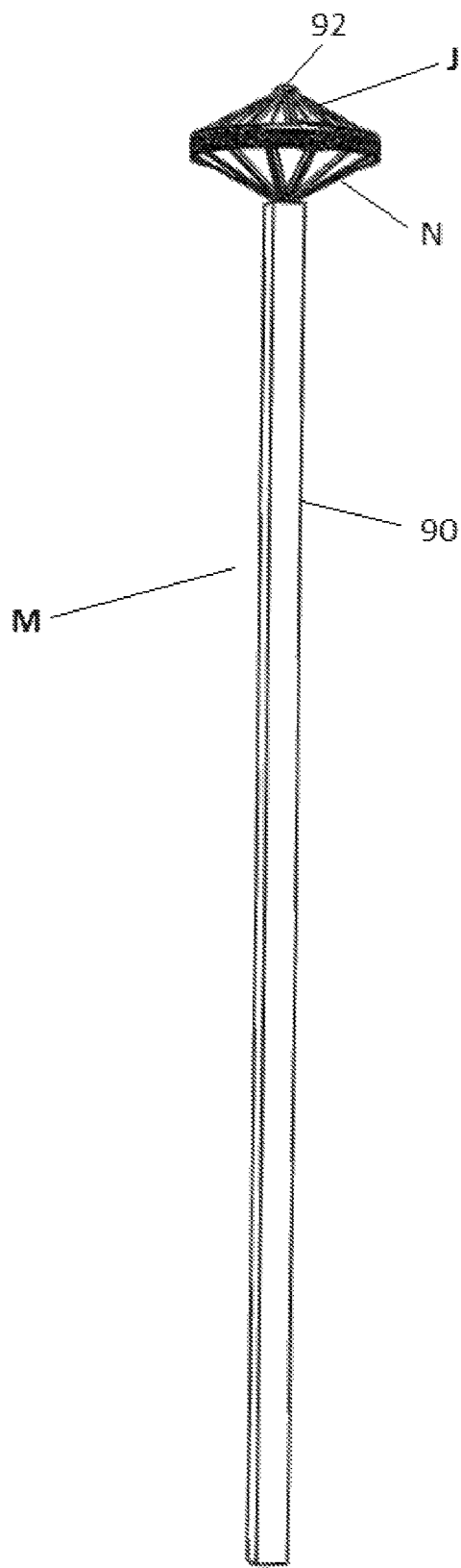
FIG. 25 is a perspective view of an alternative mounting assembly for mounting a stacked assembly of creature control members of the type illustrated in FIG. 9 and an aerodynamic, stabilizing and reinforcing member of the type illustrated in FIG. 10.

FIG. 24 illustrates a pair of stacked assemblies of creature control members J mounted to a garbage or recycling receptacle 88 using low-profile mounting assembly K and high-profile mounting assembly L with member N.

Referring to FIG. 25, a high-profile stick mount and stacked insect trapping assembly M is illustrated including support member 90 and a mounting shaft 92 connected to an upper portion of support member 90. Support member 90 can be of any desired height. Preferably, shaft 92 is inserted into a predrilled hole on the top of 1×1 vertical support 90 and fixed thereto by any suitable means. A plurality of stacked creature control members J supported by member N are mounted on and about mounting shaft 92. Members J and N are held on shaft 92 by one or more O-rings (not shown) or any other suitable fastening mechanism. Again, member N serves to support and reinforce creature control members J as well as function as an aerodynamic skirt.

This embodiment provides a static mounting device designed to be placed in a hole in the ground. Alternatively, a simple flat weighted pedestal stand can be employed to maintain support member 90 in an upright manner. This embodiment can be placed anywhere deerflies are problematic. Although the mounting assembly of this embodiment is presented as a two piece construction (i.e., shaft 92 and support 90 are separate pieces) its simplicity allows for a great variety of manufacturing options. For example, shaft 92 and support 90 could be formed as one piece. Deer flies like to chase cars traveling at low speeds through woods so excellent locations would be anywhere cars tend to park after traveling at slower speeds because as cars stop and park the flies will tend to go directly to strategically positioned static traps. Deerfly also will be attracted to motion and attack groups of living creatures. So being placed around areas of living motion/activity, these "static" traps can complement the "trolling" traps (e.g., traps located on vehicles and other moving objects including canoes, row boats, power boats, riding mowers, earth working equipment, tractors, etc.) through constant capture of deer fly. They can provide a significant unattended impact when raising livestock or any outdoor activities.

FIGS. 25A Through FIG. 25C

Referring to FIGS. 25A to 25C, another preferred form of a stackable creature control member P will now be described in connection with an alternative high-profile mounting assembly Q mounting an assembly of stackable creature control members P to the backrest portion of the seat of a riding lawn mower. While ten creature control members P are shown in FIG. 25C as forming the stacked assembly of creature control members, the stacked assembly may have any number of creature control members P.

It should be noted that an assembly of stacked creature control members P can be mounted on any portion of a riding lawn mower or any implement (e.g. lawn vacuums, hauling trailers, cultivators, aerators, tillers, etc.) that may be attached to the riding lawn mower. In this embodiment, creature control member P is an insect trap for trapping insects including but not limited to deer flies directly on creature control member P.

Stackable creature control member P can be blue or royal blue to attract and trap deer flies directly on control member P. However, this embodiment is not limited to blue or royal blue. Rather, other colors may be utilized as desired. Further, other insect attractants other than color may be utilized in connection with stackable creature control member P.

Preferably, stackable creature control member P includes a body 100 and a plurality of ribs 102. Ribs 102 can be formed as separate elements from body 100 or alternatively body 100 and ribs 102 could be formed as a single piece. Where ribs 102 are separate pieces from body 100, the insect trapping substance can be applied over the upper surface of body 100 prior to attachment of ribs 102 to body 100. Depending upon the insect trapping substance used, ribs or spacer members 102 can be partially or completely embedded in the insect trapping substance formed on the upper surface of body 100. More specifically, when the insect trapping substance is a low viscosity wet-gel adhesive (LVWGA), ribs or spacer members 102 can be completely embedded in the insect trapping substance and yet separation of adjacent creature control members P in a stacked assembly of a plurality of creature control members P can be readily and easily achieved. Where either PSA or HMPSA is used as the insect trapping substance, ribs or spacer members 102 should be formed to prevent contact of the insect trapping substance of one creature control member P from contacting an adjacent creature control member P. For example, ribs or spacers 102 can be made of sufficient thickness so that each spacer 102 extends outwardly a sufficient distance from the insect trapping substance to prevent the insect trapping substance of one creature control member P from contacting any portion of an adjacent creature control member P. Preferably, the insect trapping substance is applied to the creature control member P prior to purchase by the consumer obtaining the advantages previously explained.

The uppermost creature control member P may be free of any insect trapping substance or ribs to facilitate packaging of a stacked assembly of creature control members P.

Body 100 can be formed as a single piece from any suitable material including any material previously described for forming any previously described creature control member. Although body 100 in this embodiment has a planar surface to which the insect trapping surface is applied, a non-planar surface may be employed.

Ribs or spacers 102 can be formed from any suitable material and oriented on the upper surface of body 100 in any manner. For example ribs 102 could be formed from STYROFOAM®. In the preferred embodiment illustrated in FIGS. 25A to 25C, four ribs 102 extend parallel to the longitudinal axis of body 100 and two ribs 102 extend perpendicular to the longitudinal axis of body 100. Again, the number and orientation of ribs 102 may be varied as desired. Further, the configuration of ribs 102 may be readily varied as desired. For example, ribs 102 can take the form of any previously described spacer member or rib including but not limited to beads 12.

High-profile mounting assembly Q preferably includes a support pole or shaft 104, creature control support member 106, L-shaped pole support 108 and pole guide member 110. Support 108 may be a leaf spring or other shock absorbing member. Body 112 of support member 106 preferably has a plate like configuration. A plurality of retaining members 114 are spaced along the outer periphery of body 112 to prevent creature control members P from sliding off of body 112. One or more detachable straps 116 removably secure creature control members P to body 112. L-shaped pole support 108 can be attached to the backrest of the seat of the riding lawn mower by any suitable means. Pole guide member 110 may include a recess or groove 118 to receive a corresponding portion of shaft or pole 104.

Any suitable fastening means may be utilized to secure the lower portion of pole or shaft 104 to outwardly extending leg 120 of L-shaped pole support 108. For example, outwardly extending leg 120 may have an opening for receiving a corresponding portion of shaft 104. The opening may be sized to create an interference fit or force fit that retains shaft 104 in a desired position but allows height adjustment of shaft 104. Shaft 104 is preferably formed from a lightweight material. Further, pole 104 may be formed from a flexible and bendable material allowing the pole 104 to be bent to locate creature control members P in a desired position. A fastener 122 removably secures body 112 to pole 104. Preferably, fastener 122 permits body 112 to rotate or pivot on pole 104 when body 112 strikes an object.

This embodiment like previously describe embodiments is free of separating elements and separating agents between adjacent creature control members P. Further, ribs or spacers 102 are not removed from creature control member P during use of the control member as an insect trap.

FIGS. 26 Through 35A

Referring to FIGS. 26 to 35A, another preferred form of stackable creature control member S is illustrated. Creature control member S is preferably a wearable shell for trapping insects directly on the exterior surface thereof. As shown, creature control member S is configured to be attached to the rear portion of an equestrian riding helmet T. Creature control member S can be formed from any suitable material including any material previously described for forming creature control members formed in accordance with the other preferred forms of the present invention.

Creature control member S can be further configured to fit on any type of head gear worn by an individual including but not limited to bicycle helmets, construction helmets, motorcycle/ATV helmets, hats, visors and eye protectors. Further, creature control member S can be configured so that it can be worn on any portion of an individual including an individual's torso, chest, back, arms, hands, legs, feet, neck, face, etc.

Like all previously described creature control members, the insect trapping substance is preferably applied to member S prior to purchase by the consumer. Similarly, member S does not need or require any type of release barrier or release agent but instead uses integrated features (e.g., ribs) which obstruct and prevent adhesive contact between stacked creature control members S. Preferably, member S is configured to prevent the insect trapping substance formed on the exterior surface of creature control member S from rubbing off onto or otherwise contaminating an adjacent creature control member S to ensure that the interior surface of creature control member S which contacts the individual or an object worn by the individual is clean and free of any insect trapping substance.

The uppermost creature control member S in a stacked assembly of creature control members S can be free of insect trapping substance to facilitate packaging of the stacked assembly. Creature control member S can be blue or royal blue to attract deer flies.

Figure 26:
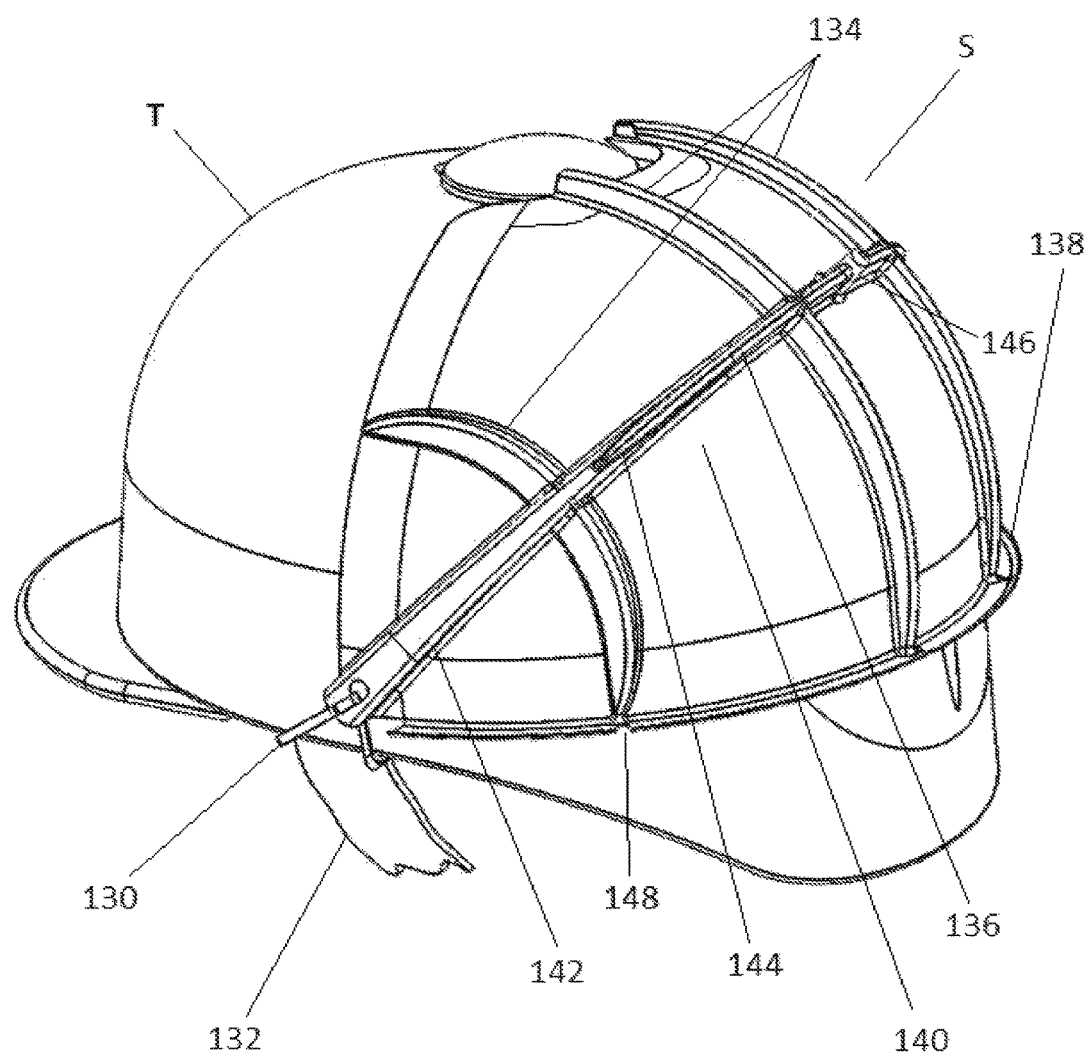
FIG. 26 is a perspective view of another alternative form of creature control member mounted on an equestrian riding helmet.

Preferably, a removable or detachable wire "tie strap" 130 passing through opening 128 and wrapping around helmet strap 132 detachably connects creature control member S to helmet T as seen in FIG. 26. Another strap may be used on the opposite side of creature control member S. It should be noted that any other fastener may be used for detachably connecting creature control member S to helmet T to maintain creature control member S in a desired position on helmet T including but not limited to hook and loop type fasteners, a base protective guard, reusable clasps, pin type clasps, pins and Dual Lock™ fasteners.

The base geometry of creature control member S is a semi-rigid sheet sphere which is normally not very flexible. Adding flexibility to this structure reduces cost by allowing greater conformity to different size heads, hat or helmets. Hence, the number of different mold sizes is significantly reduced where creature control member S is flexible. Flexibility and hence size adjustability of creature control member S is preferably achieved by utilizing tall, hollow ribs 134 and 136. Ribs 134 and 136 preferably provide the spherically shaped shell with a sufficient degree of flexibility or give allowing each shell to fit on several different size helmets. Flexibility can be controlled through the height, quantity and direction of each rib. An extreme example would be to form ribs in an accordion bellows type configuration.

Creature control member S includes a gutter or lip 138 that prevents insects trapped on creature control member S from sliding off Ribs 134 and 136 and lip or gutter 138 are preferably free of insect trapping substance. Insect trapping substance may be applied to all or only a portion of the remaining portions of the exterior surface of creature control member S.

Figure 27:
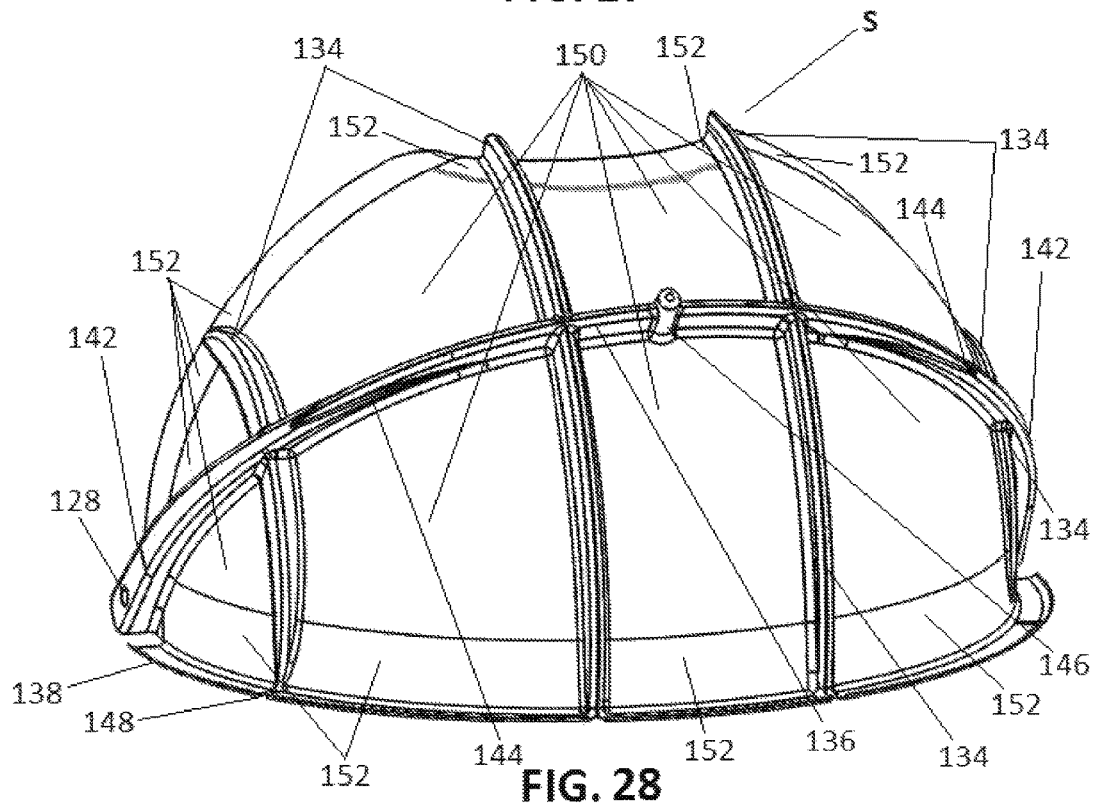
FIG. 27 is a perspective view of the creature control member illustrated in FIG. 26 taken from an oblique rear vantage point.
Figure 28:
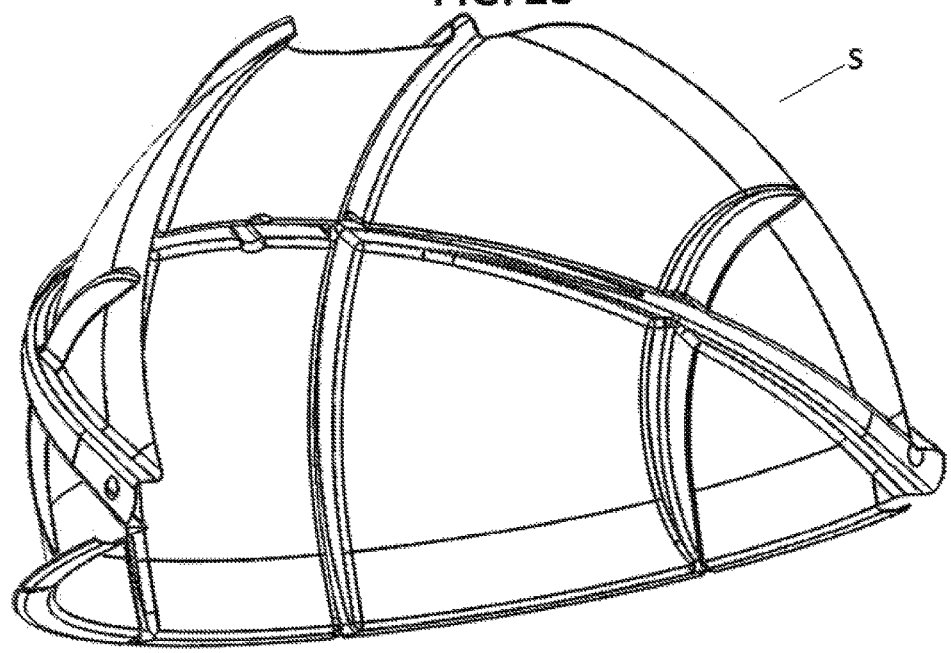
FIG. 28 is a perspective view of the creature control member illustrated in FIG. 26 taken from an oblique front vantage point.
Figure 29:
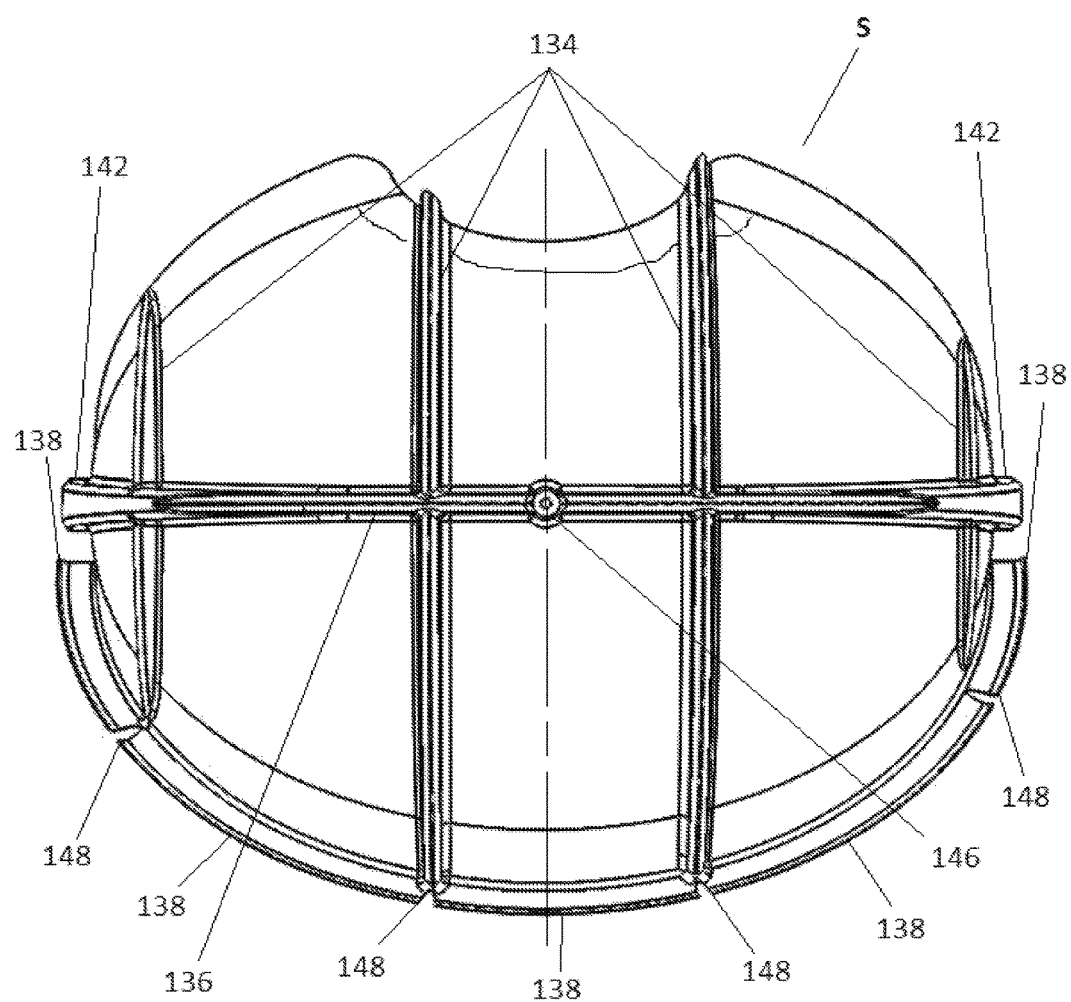
FIG. 29 is a draft or mold extraction view of the creature control member illustrated in FIG. 26.
Figure 33:
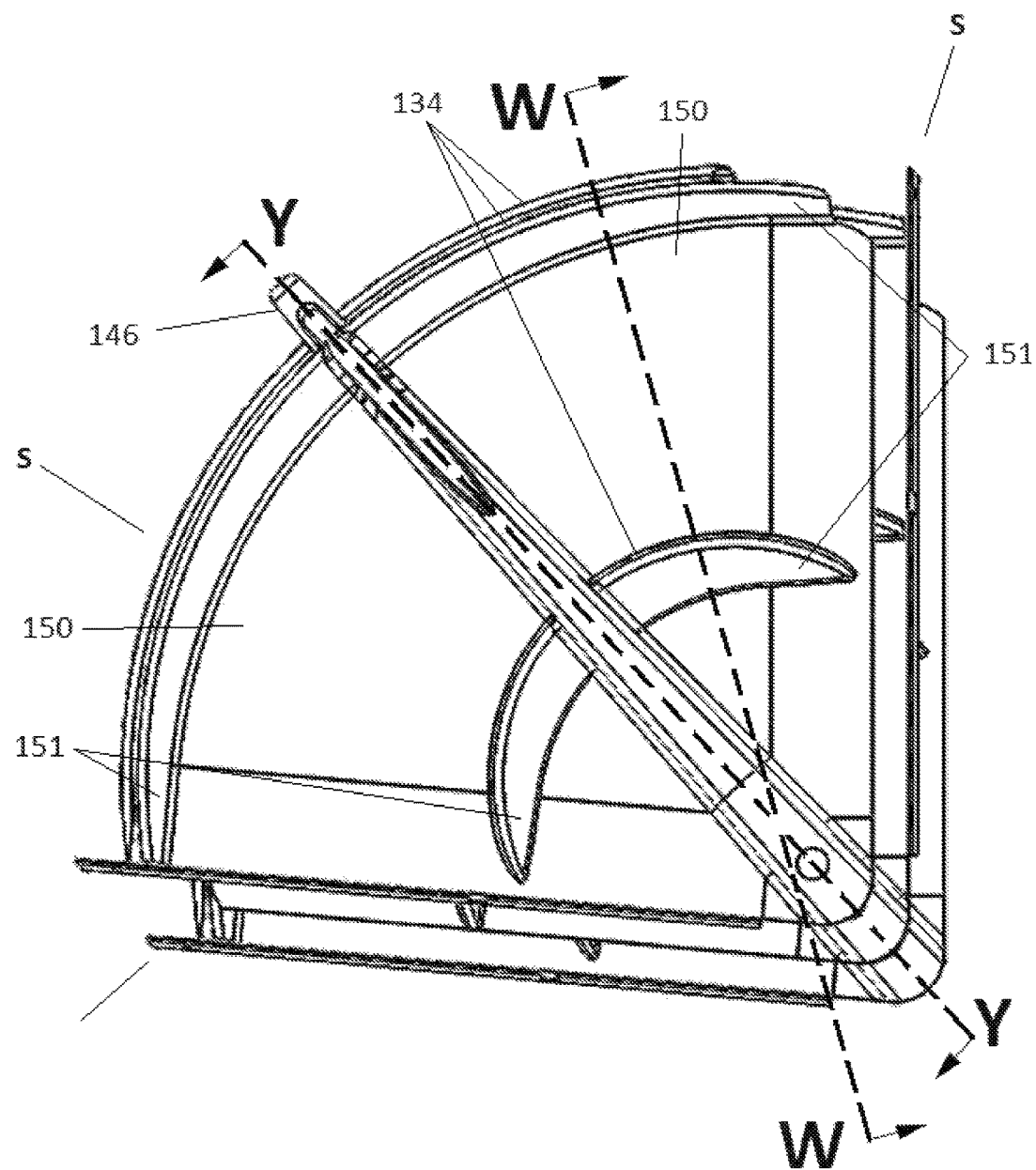
FIG. 33 is a right side view of a stacked assembly of three creature control members of the type illustrated in FIG. 26.
Figure 38:
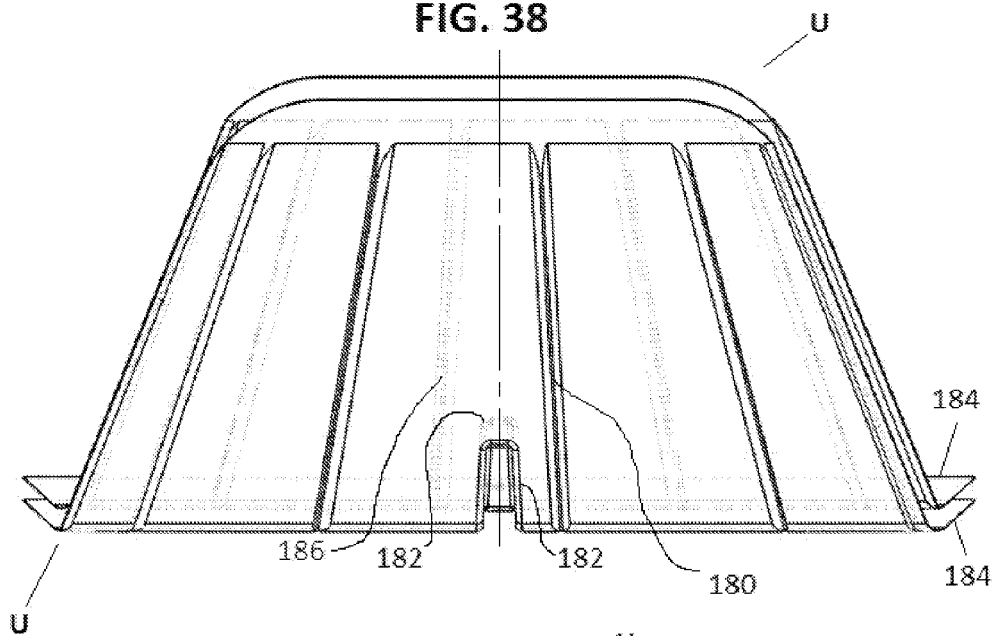
FIG. 38 is a perspective view of a stacked assembly of two creature control members of the type illustrated in FIG. 36 with hidden lines illustrating the staggering of the spacer members of the lower creature control member from the spacer members of the upper creature control member.
Figure 39:
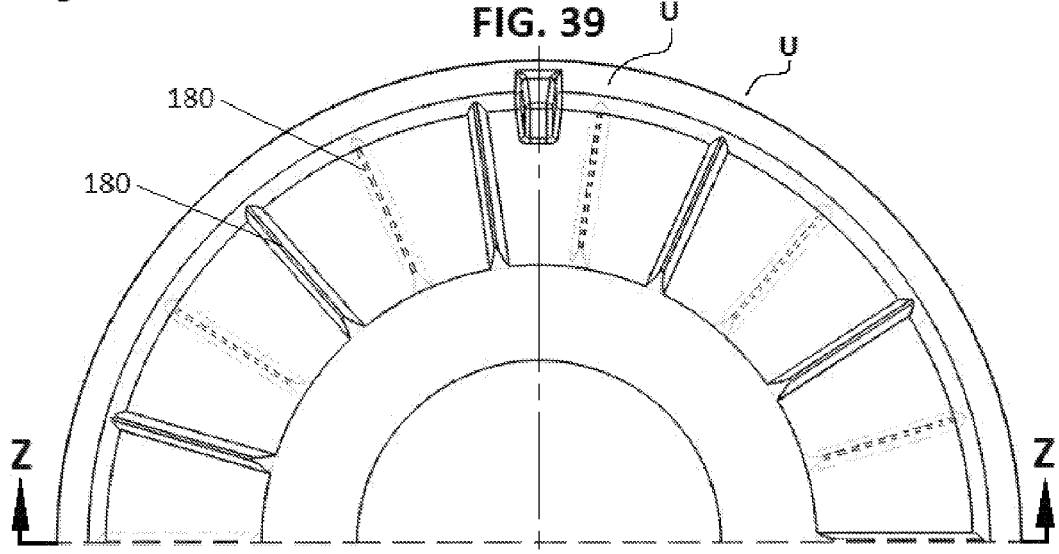
FIG. 39 is a plan view of one section of the stacked assembly depicted in FIG. 37 taken through lines Z-Z in FIG. 38.

Referring to FIG. 27, four asymmetrical and vertically oriented ribs 134 allow for flexibility (expansion and contraction) in the horizontal direction. Referring to FIG. 29, the asymmetrical orientation of ribs or spacer members 134 from the centerline of the creature control member S is best seen. Ribs 134 act as obstructing features strategically located for contact with the interior surface of a creature control member S mounted directly on top of a lower creature control member S as seen in, for example, FIGS. 34, 34A, 34B and 34C. Referring to FIG. 33, it is readily apparent that ribs or spacer members 134 do not have the same center point as corresponding domes 150 and 152. In other words, ribs or spacer members 134 are not concentric with domes 150 and 152 demonstrated by the varying height of ribs 134 over their length. For example, the height of end portions 151 of ribs 134 at the front and rear of creature control member S is less than the height of the portion of ribs 134 in which line Y-Y passes through. Further, the distance from the uppermost surface of rib 134 to dome 150, as seen in FIG. 33, decreases with greater distance from the center point of each rib 134. This tapering design of ribs 134 is necessary to maintain full contact over the length of ribs 134 with the interior surface of the next creature control member S in a stacked assembly. For many irregular complex 3-D surface/contour, the configuration of spacers or ribs over their length will need to be adjusted to ensure full contact between the ribs or spacers over their entire length and the adjacent creature control member.

The single horizontally oriented rib 136 is multifunctional by virtue of its three parts. The center-most portion 140 adds flexibility top to bottom. Referring to FIG. 34, the drafted tapered portion 142 on each side of center portion 140 controls the extent to which one creature control member S can seat on top of another creature control member S. More specifically, by altering the taper of portion 142 the spacing between portions of a lower creature control member S and portions of a creature control member S mounted on top of the lower creature control member S can be varied. Portions 142 also act as an alignment member to limit movement of one creature control member S relative to an adjacent creature control member in a stacked assembly of creature control members S. For example, portion 142 prevents a creature control member S from sliding sideways against an adjacent creature control member. Areas 144 define where center portion 142 and the corresponding drafted tapered portions 142 transition.

Referring to FIGS. 35 and 35A, hollow tapered pin 146 of a lower creature control member S partially nests in hollow tapered pin 146 of a creature control member S mounted directly on top of the lower creature control member S. Hence, pin 146 acts to restrict sliding of adjacent creature control members.

The design of this embodiment will allow application of LVWGAs, PJ, PSAs, or HMPSAs as the insect trapping substance. Gutter 138 also protects from run off of LVWGA or PJ when these substances are used as the insect trapping substance. Gutter 138 has slots, recesses or grooves 148 at the base of each rib 134 to ensure flexibility. In this embodiment, the insect trapping substance is preferably only applied to the six dome surfaces 150 shown. The insect trapping substance or adhesive should reasonably avoid any peripheral edges of the creature control member when the creature control member is mounted on or about a portion of an individual. In this case adhesive gel or insect trapping substance should not be applied to any surfaces of gutter 138 or to any of the cylindrical or dome area boundaries 152. However, PSAs, or HMPSAs adhesives/insect trapping substances may be applied closer to the peripheral boundaries because these substance will not run as easily but the tops of the ribs 134 and 136 and the two draft tapered portions 142 should be free of adhesives/insect trapping substances regardless of the type of adhesives/insect trapping substances used. The draft tapered 142 areas are intended for handling so the abutting/adjacent dome shaped surfaces 152 should also free of adhesives/insect trapping substances.

Figure 30:
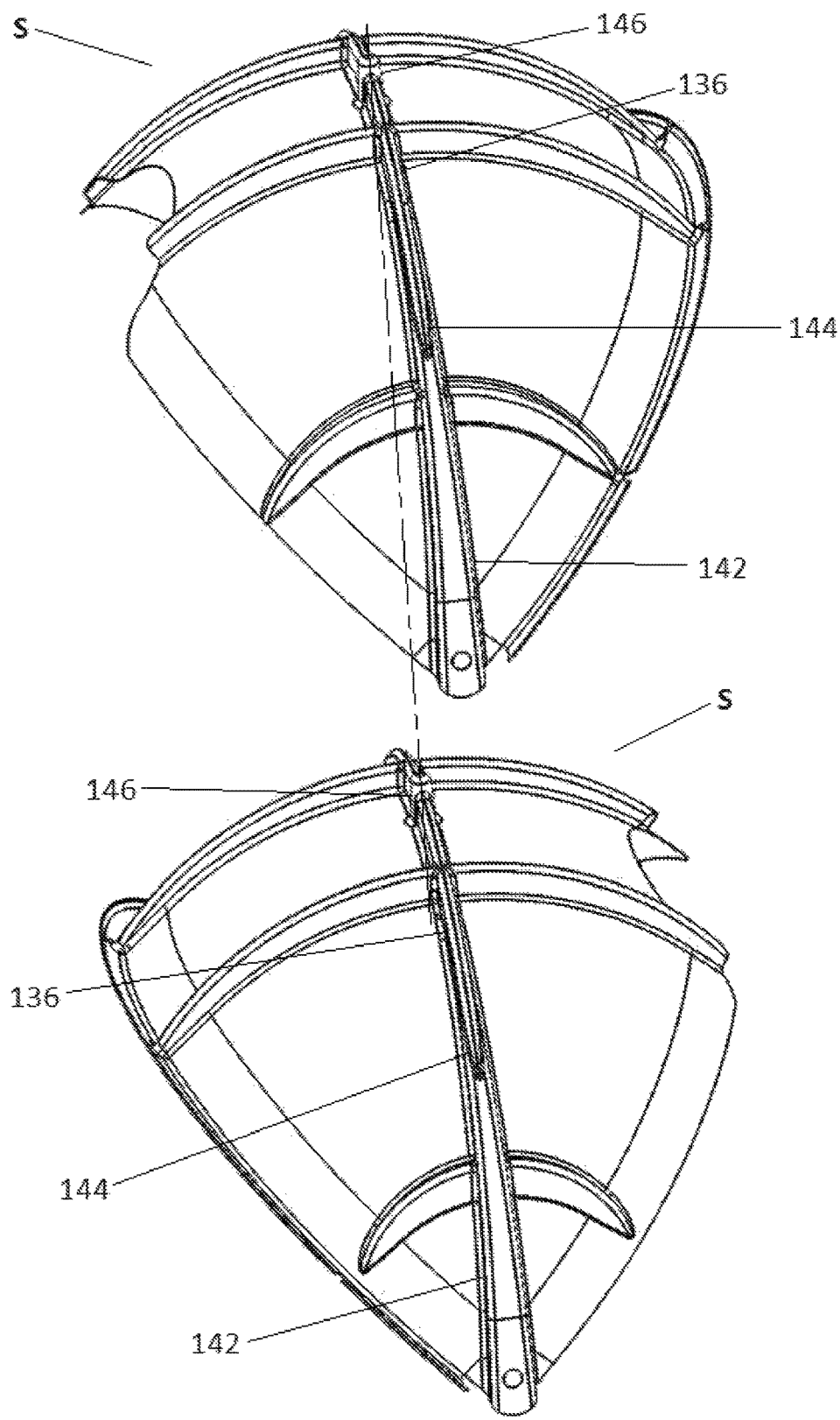
FIG. 30 is an exploded perspective view of two creature control members of the type illustrated in FIG. 26.
Figure 31:
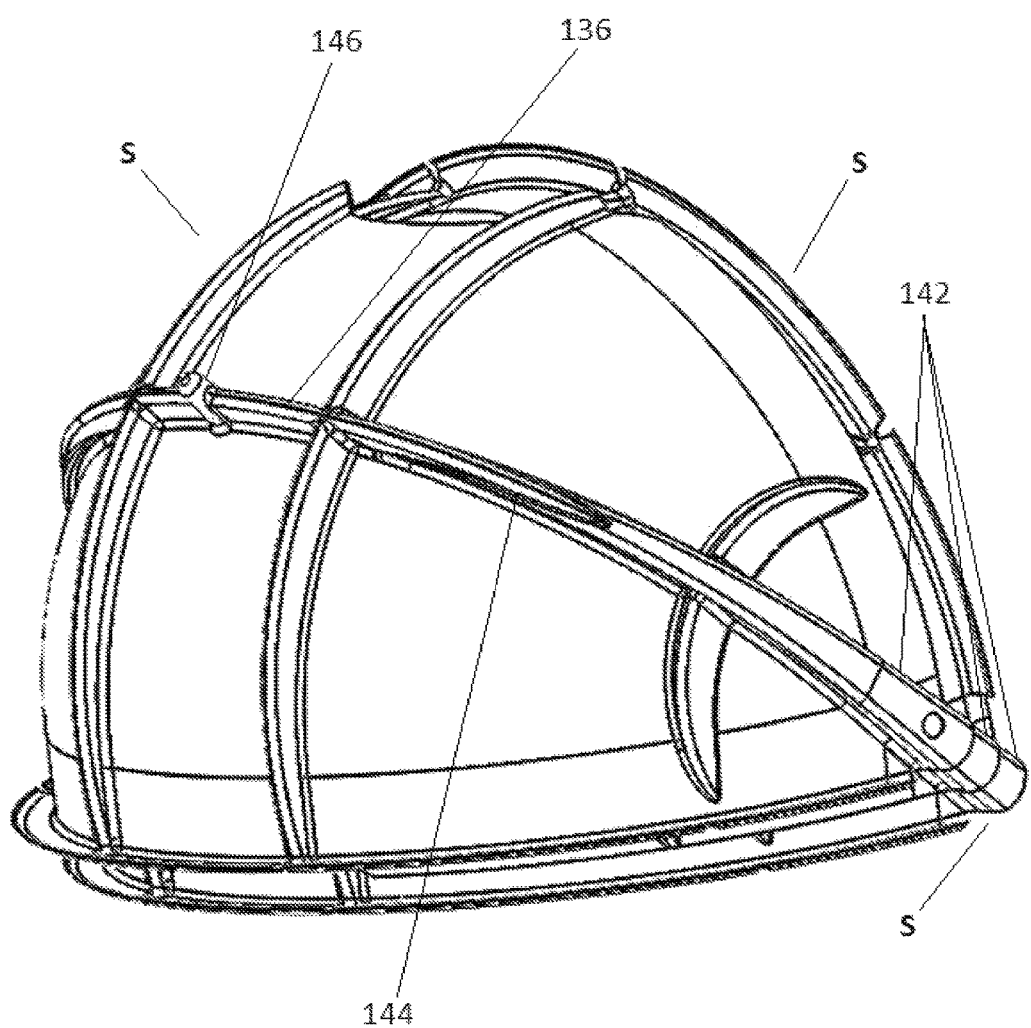
FIG. 31 is a perspective view of a stacked assembly of three creature control members of the type illustrated in FIG. 26 with the middle creature control member having a different orientation for the upper and lower creature control members.
Figure 32:
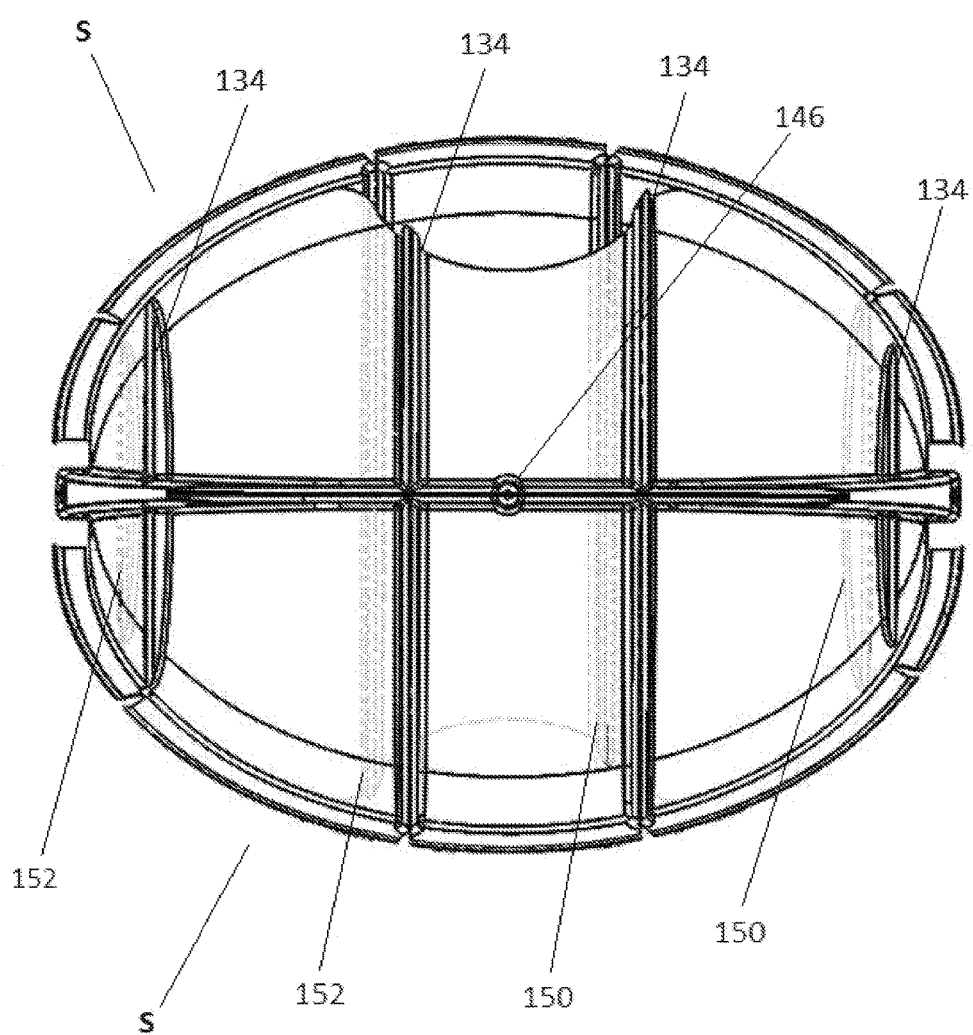
FIG. 32 is a draft or mold extraction view of two creature control members of the type illustrated in FIG. 26.

Referring to FIG. 30, the orientation of two adjacent creature control members S in a stacked assembly of creature control members S is illustrated. By orienting adjacent creature control members S in this manner, the asymmetrical ribs 134 of a the lower creature control member S do not nest in the hollow cavities of the asymmetrical ribs 134 of a creature control member S mounted directly on the lower creature control member S as is readily seen FIGS. 32, 34, 34A, 34B and 34C. Rather, as shown in FIGS. 34, 34A, 34B and 34C, each of the ribs 134 has a contact surface 160 for contacting the interior surface of an adjacent creature control member S to prevent the insect trapping substance on a lower creature control member S from coming into contact with any portion of a creature control member S mounted directly on top of the lower creature control member S. Referring to FIGS. 30 and 31, one can readily see how drafted tapered portions 142 function to maintain the 180° orientation between adjacent creature control members S in a stacked assembly. Hence, the multitasking tapered portions 142 provide rotational control but are also carefully designed to control the spacing of adjacent creature control members S in a stacked assembly. Stabilizer pin 146 prevents forward and rearward motion of stacked parts. Side to side motion is also controlled to some degree by the stabilizer pin 146. Stabilizer pin 146 can also act to control spacing of adjacent creature control members S by controlling the interference draft angle of pin 146. Referring to FIG. 35A, it is readily apparent that interference draft angle of stabilizing pin 146 is configured to obstruct so pin 146 will not fully insert into the adjacent stabilizing pin 146 of a creature control member S mounted on top.

FIG. 31 through FIG. 35A illustrate a stacked assembly of three creature control members S. However, the number of creature control members S in any given stack may be varied as desired.

FIGS. 36 Through 45

Referring to FIGS. 36 to 45, another preferred form of stackable creature control member U is illustrated. Creature control member U is preferably useable with indoor or outdoor lights and associated light fixtures as explained in more detail below. Creature control member U can be formed from any suitable material including any material previously described for forming creature control members formed in accordance with the other preferred forms of the present invention. Preferably, when mounted over a light, creature control member U should be formed from a light transmitting material.

Like all previously described creature control members, the insect trapping substance is preferably applied to member U prior to purchase by the consumer. Similarly, member U does not need or require any type of release barrier or release agent but instead uses integrated features (e.g., ribs) which obstruct and prevent or limit adhesive contact between stacked creature control members U.

Where either PSAs, or HMPSAs is the insect trapping substance, member U is configured to prevent the insect trapping substance formed on the exterior surface of creature control member U from rubbing off onto or otherwise contaminating an adjacent creature control member U to facilitate separation of each of the creature control members in a stacked assembly of a plurality of creature control members U. The uppermost creature control member U in a stacked assembly of creature control members U can be free of insect trapping substance to facilitate packaging of the stacked assembly. Creature control member U can be blue or royal blue to attract deer flies.

Creature control member U is preferably formed from a single piece and includes eleven hollow ribs or spacer members 180, a pair of hollow alignment or anti-rotation tabs, ribs or projections 182 and gutter 184. In some uses (e.g., outdoor use), gutter 184 may including a plurality of drainage openings to allow water to flow off of the creature control member U. Ribs 180 in this embodiment are equally spaced. Hence, if one creature control member U is stacked on top of another creature control member U in the same orientation, ribs 180 of the lower creature control member U could extend into the hollow cavity of the corresponding ribs and contact the interior surface of the corresponding hollow ribs of the upper creature control member U. This could hamper separation of one creature control members U from a directly adjacent creature control member U. To avoid this potential separation issue, this embodiment utilizes an odd number of ribs 180. In this embodiment eleven ribs 180 are present. However, the number and configuration of the ribs may be readily varied as desired. For example, the ribs can take the form of any previously or subsequently described ribs or spacer members including but not limited to hollow pins or hollow dimples. By rotating 180 degrees one creature control member U from a directly adjacent creature control member U, ribs 180 of a lower creature control member U are not aligned with ribs 180 of a creature control member U stacked directly on top of the lower creature control member U as seen in FIGS. 38 to 42. It should be noted that staggering of ribs 180 of adjacent creature control members U can be achieved in numerous different ways. For example, two different molds can be used for forming creature control members U to prevent alignment of the ribs of adjacent stacked creature control members U. One mold could vary the orientation and/or the number of the ribs from the orientation and/or number of the ribs in the other mold to prevent alignment of the ribs of adjacent stacked creature control members U.

Figure 40:
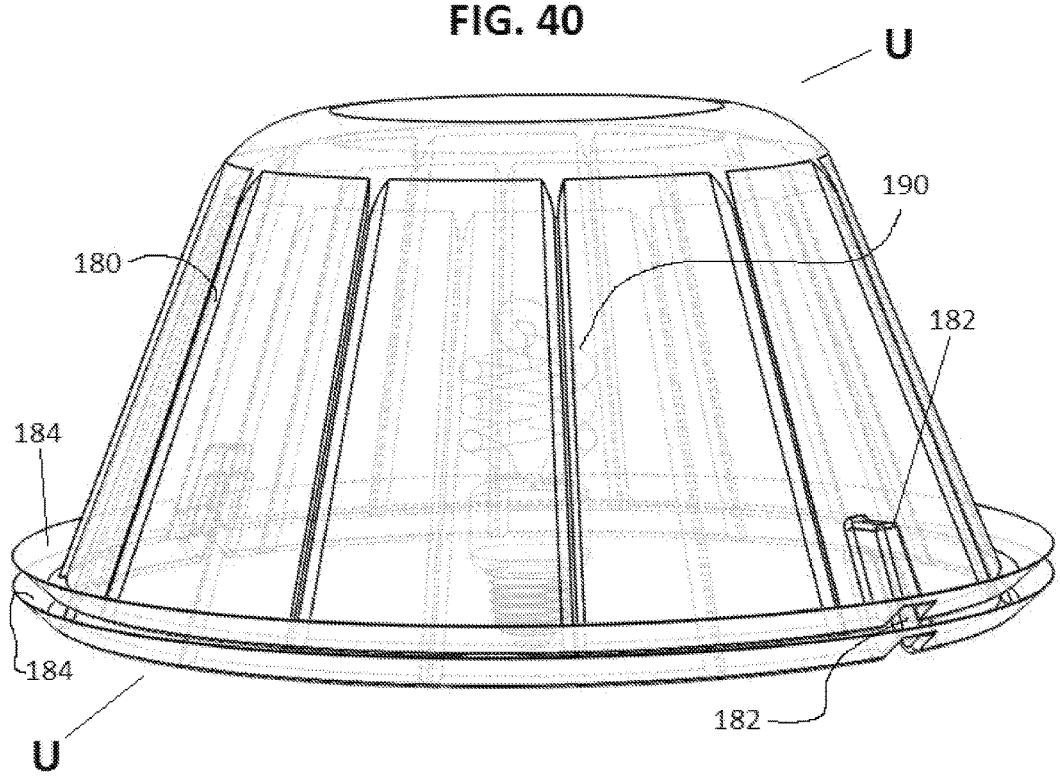
FIG. 40 is a perspective view of the stacked assembly depicted in FIG. 37 mounted about a light bulb.

When stacked, members 182 of a lower creature control member U extend into the hollow cavity of the corresponding member 182 of a creature control member U stacked directly on top of the lower creature control member U preventing rotation or sliding of one creature control member U relative to the other creature control member U as seen for example, in FIG. 40. It should be noted that the number and configuration of members 182 can be readily varied as desired. For example, members 182 could be hollow pins, dimples or other structures that act to prevent relative rotation between adjacent creature control members U.

The design of this embodiment will allow application of LVWGAs, PJ, PSAs, or HMPSAs as the insect trapping substance. Gutter 184 prevent insects from sliding off of creature control member U and prevents run off of LVWGA or PJ when these substances are used as the insect trapping substance. Where LVWGA or PJ are used as the insect trapping substance, the insect trapping substance can be applied on each of the surfaces 186 extending between adjacent ribs 180 as well as on ribs 180. In this case adhesive gel or insect trapping substance should not be applied to any surfaces of gutter 184 as the gutter is intended to be gripped by an individual to manipulate creature control member U. Further, surfaces of member 182 may be free of insect trapping substance for similar reasons. However, where either PSAs, or HMPSAs is used as the adhesives/insect trapping substance, ribs 180 and members 182 should also be free of any such substance to facilitate separation of stacked creature control members U. The draft angle/taper of members 182 may be varied to vary the spacing between portions of adjacent creature control members U.

Figure 41:
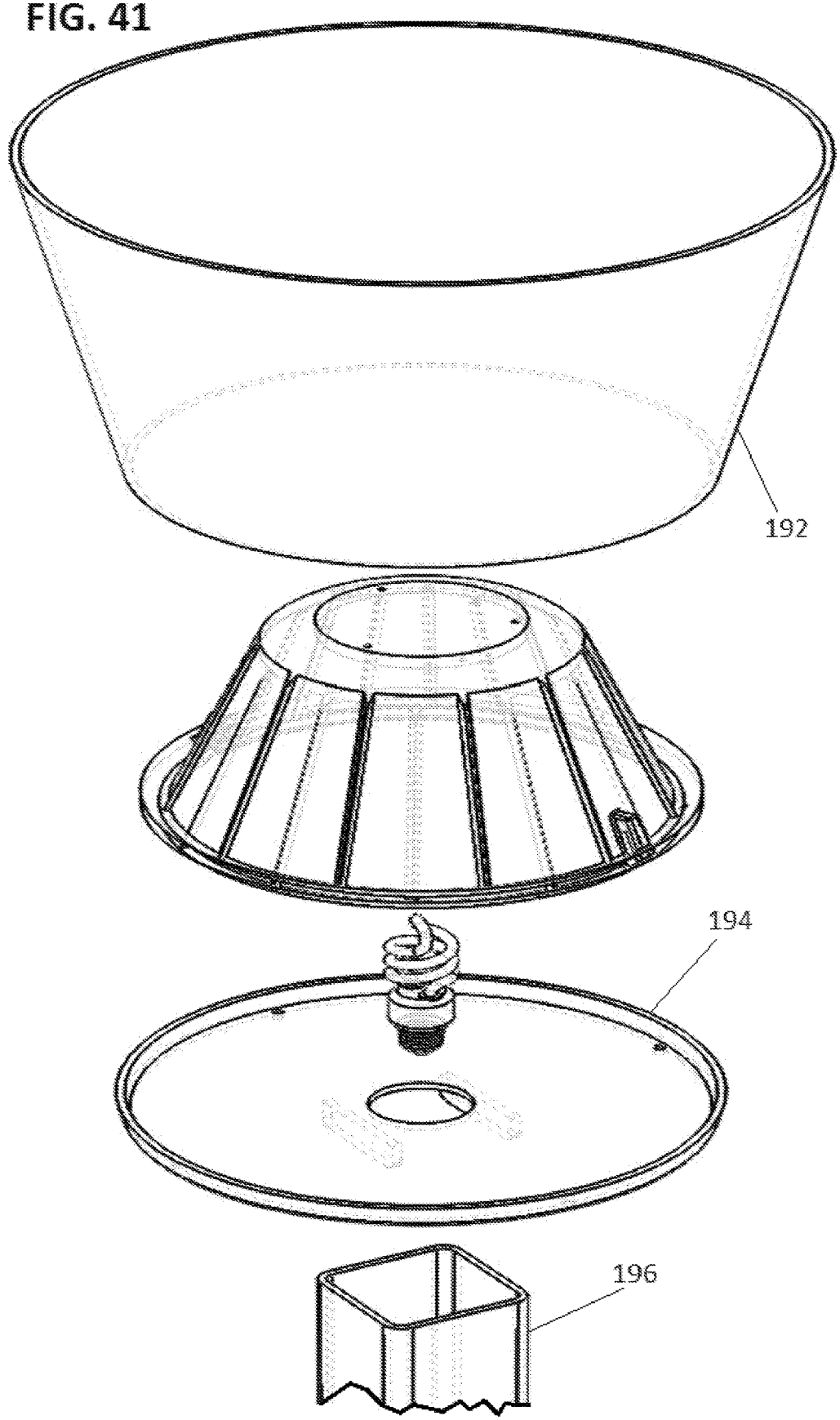
FIG. 41 is an exploded perspective view of a lighting assembly with the stacked assembly illustrated in FIG. 36.
Figure 42:
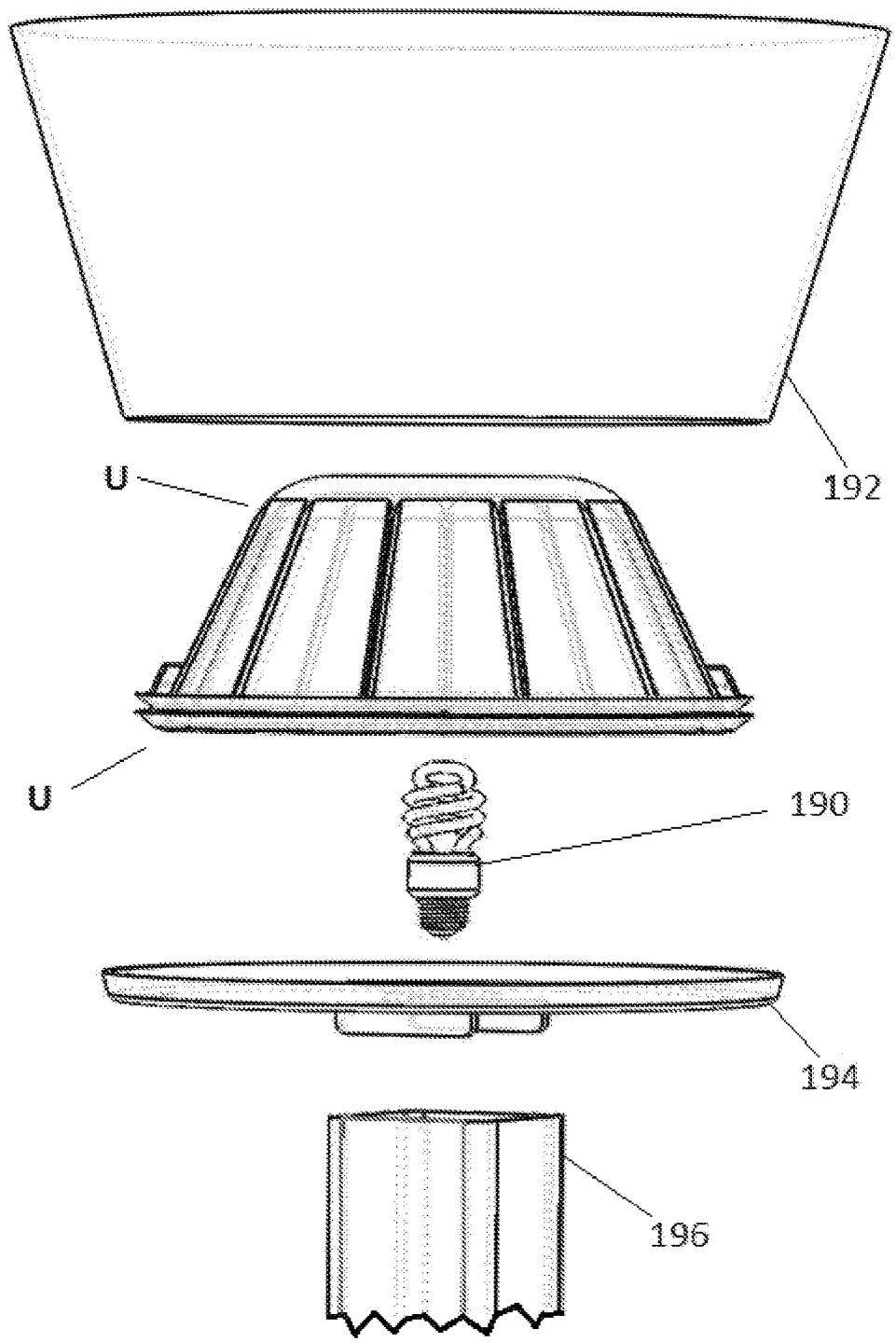
FIG. 42 is an exploded elevational view of the embodiment depicted in FIG. 41.
Figure 43:
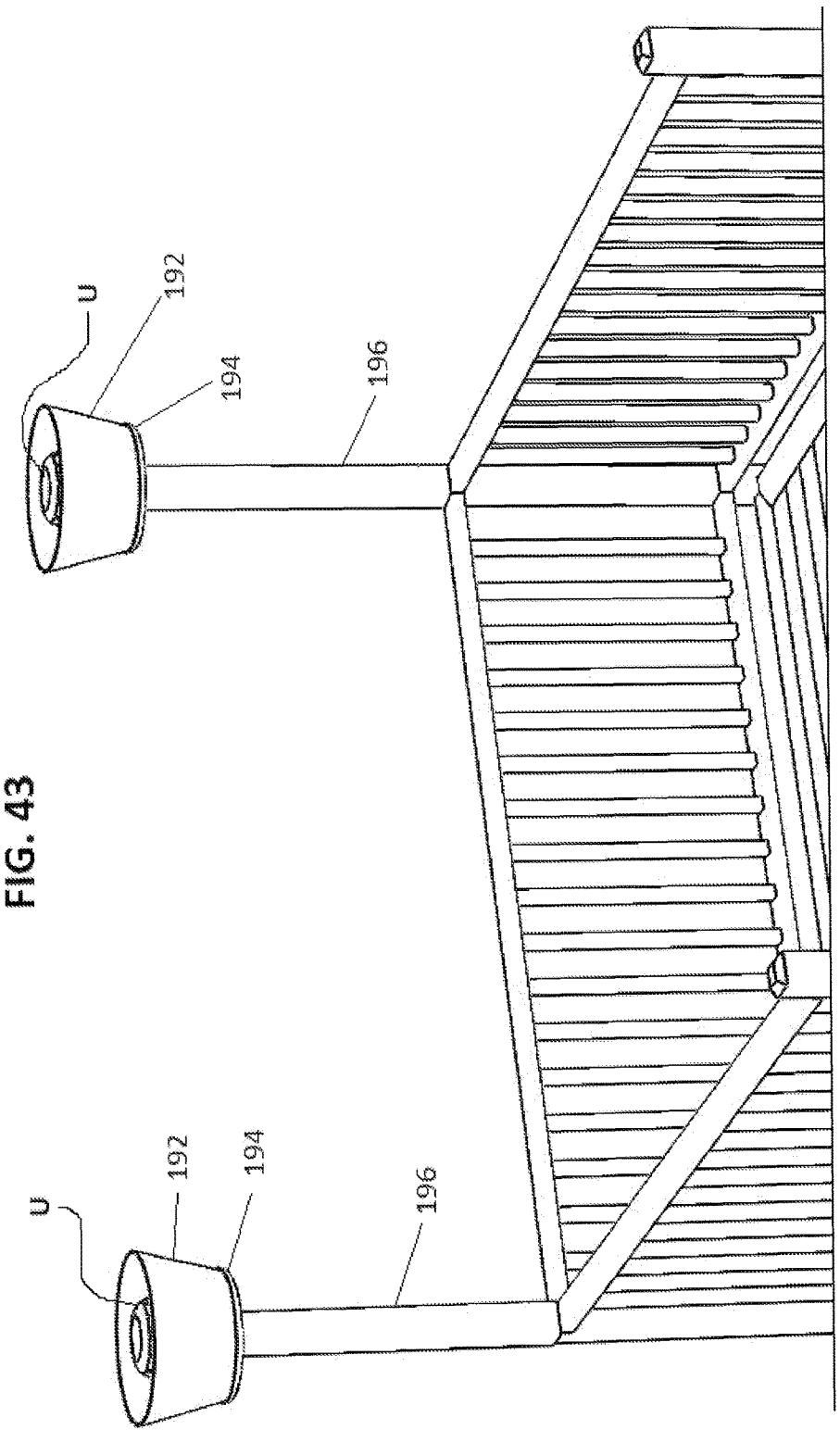
FIG. 43 is a perspective view of the lighting assembly illustrated in FIG. 41 mounted on railing of a deck.
Figure 44:
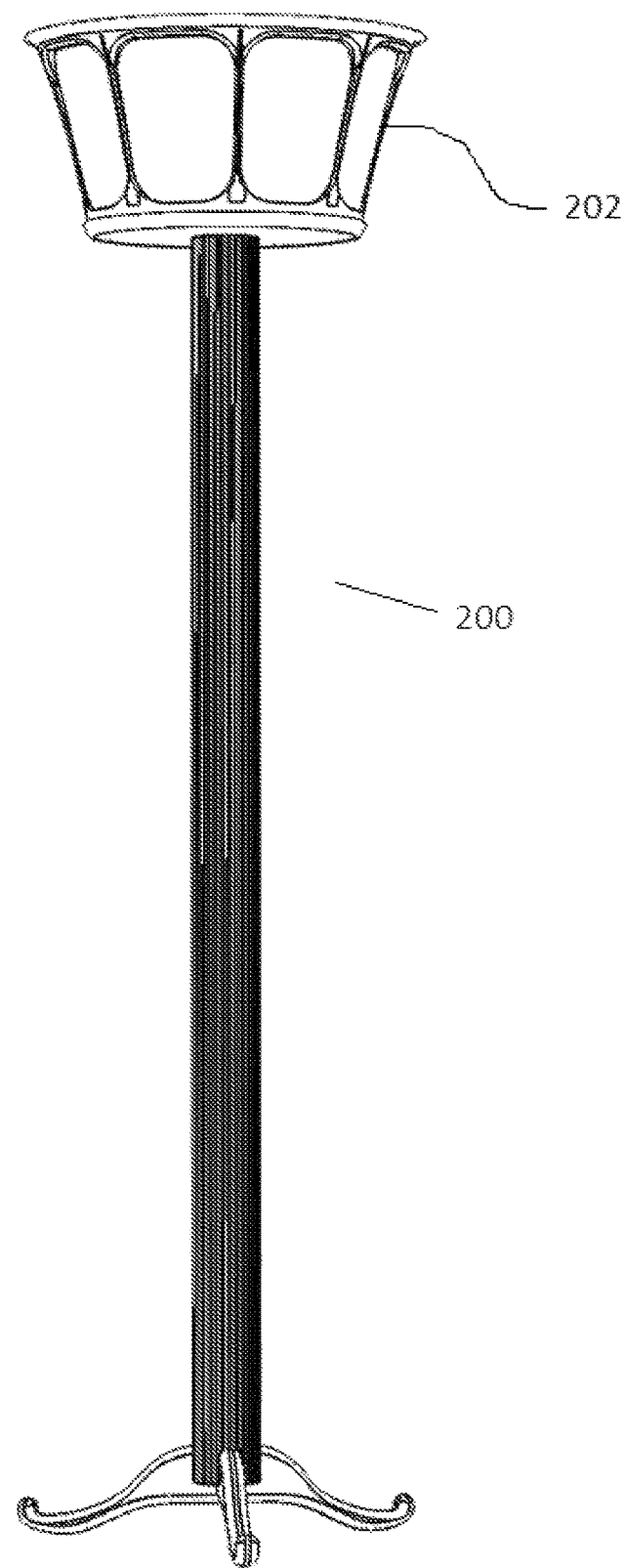
FIG. 44 is a free standing light having the stacked assembly illustrated in FIG. 36.

Referring to FIGS. 40 to 45, a stacked assembly of creature control members U is shown in several of many different possible uses with lights. For example, FIG. 40 illustrates a stacked assembly of two creature control members U disposed about a light 190. The number of creature control members U in a stacked assembly may be readily varied as desired. FIGS. 41 and 42 illustrate one of many lightening assemblies in which a stacked assembly of creature control members U can be used with. In this embodiment, the lightening assembly includes an opaque housing or shade 192, light 190, mounting plate 194 and support 196. FIG. 43 illustrates two lightening assemblies of the type shown in FIGS. 41 and 42 mounted on a railing of a deck of a building. FIG. 44 illustrates an example of a free standing designer lamp 200 that includes a stacked assembly of two or more creature control members U inside of shade 202. The number of creature control members will be dictated by the amount of light blocked by the transparent creature control members.

Figure 45:
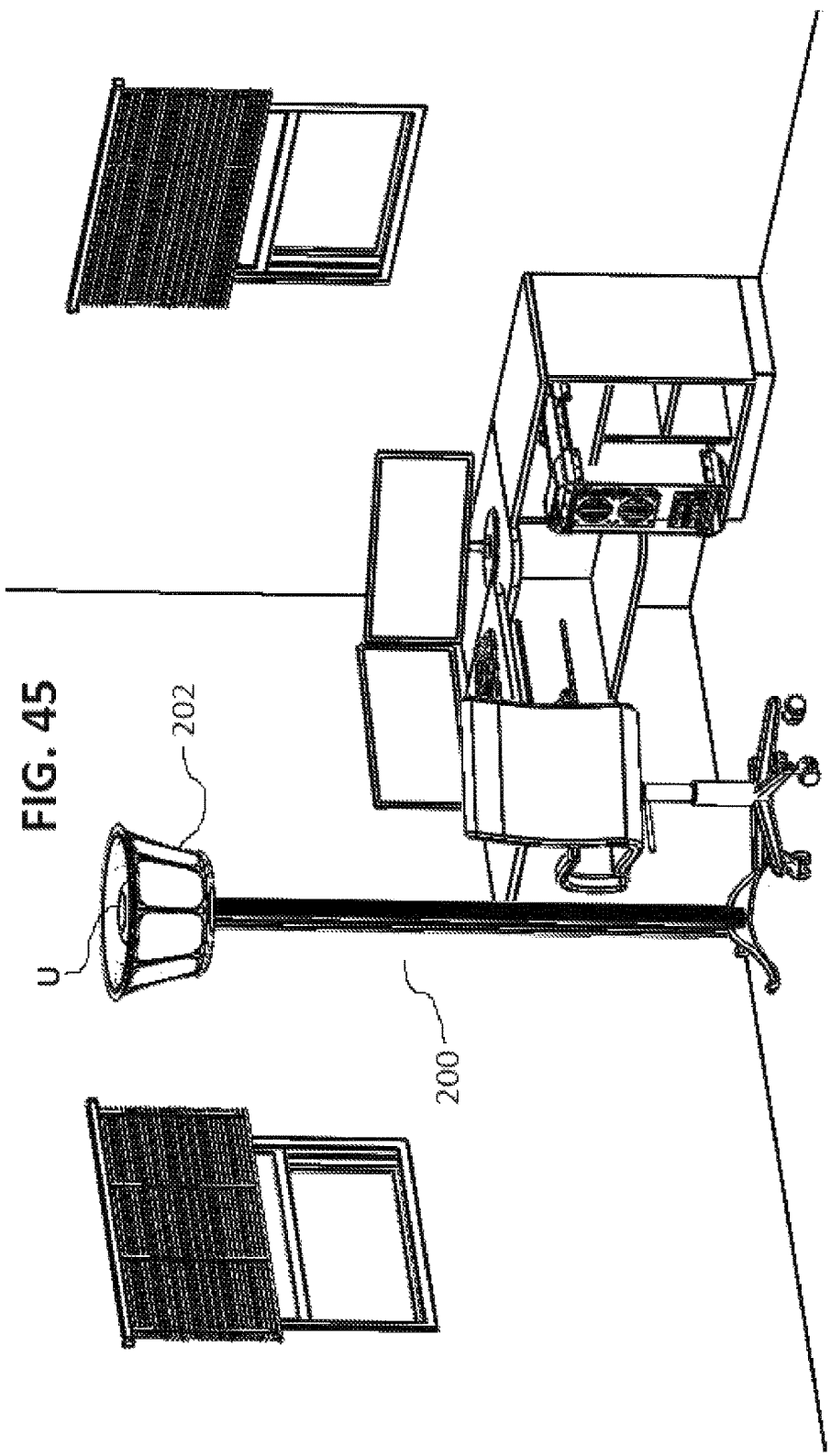
FIG. 45 is a fragmentary perspective view of the free standing light of FIG. 44 positioned in a room of a building.

It should be noted that this embodiment can be used with any light regardless of whether the light is free standing or mounted or otherwise attached to any surface be it a surface located indoors or outdoors. For example, creature control members U can be mounted about or adjacent a camping light or can be mounted on a flashlight. FIG. 45 illustrates the free standing lamp 200 in a room of building. It should be noted that creature control member need not be located in a light fixture but rather could be strategically located adjacent any light or lightening assembly.

FIGS. 46 Through 49

Referring to FIGS. 46 to 49, another preferred form of stackable creature control member X is illustrated. Creature control member X is preferably used as a bird repellent and accordingly has a creature control substance formed thereon that repels but does not trap birds. Any suitable bird repellent including but not limited to Tanglefoot bird repellent from Contech Enterprises can be applied to creature control member X. Creature control member X can be formed from any suitable material including any material previously described for forming creature control members formed in accordance with the other preferred forms of the present invention.

Like all previously described creature control members, the creature control substance (bird repellent in this embodiment) is preferably applied to member X prior to purchase by the consumer. Similarly, member X does not need or require any type of release barrier or release agent but instead uses integrated features (e.g., ribs) which obstruct and prevent or limit adhesive contact between stacked creature control members X.

The uppermost creature control member X in a stacked assembly of creature control members X can be free of insect trapping substance to facilitate packaging of the stacked assembly.

Figure 46:
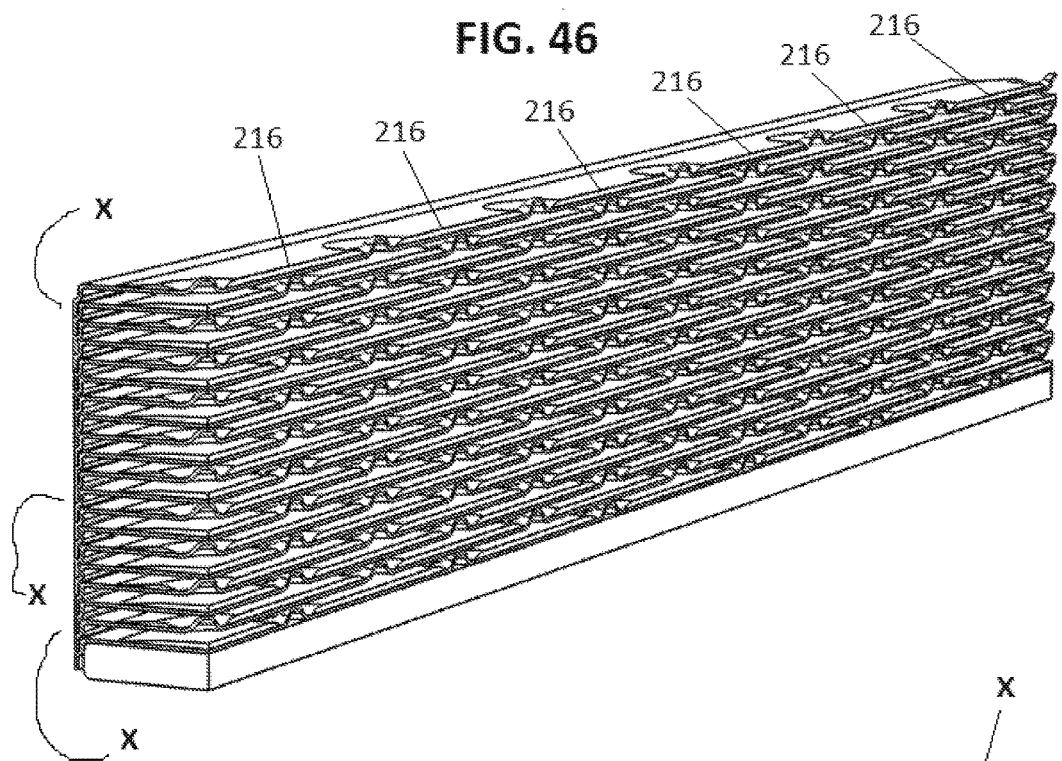
FIG. 46 is a fragmentary perspective view of another alternative form of stacked creature control members.
Figure 47:
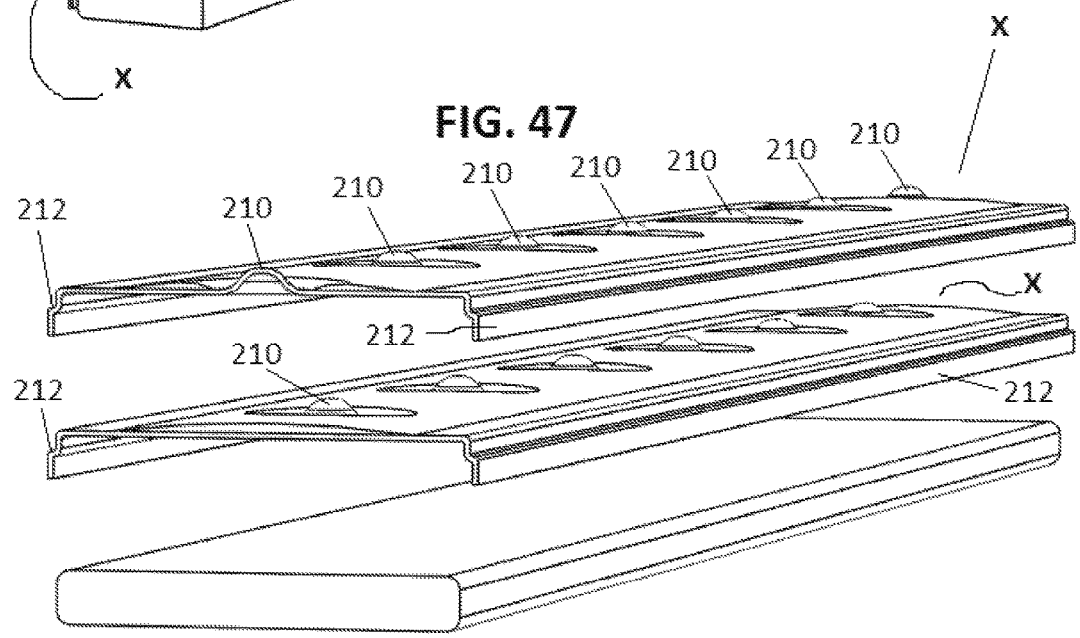
FIG. 47 is an exploded view of two creature control members of the type illustrated in FIG. 46 above a support member.
Figure 48:
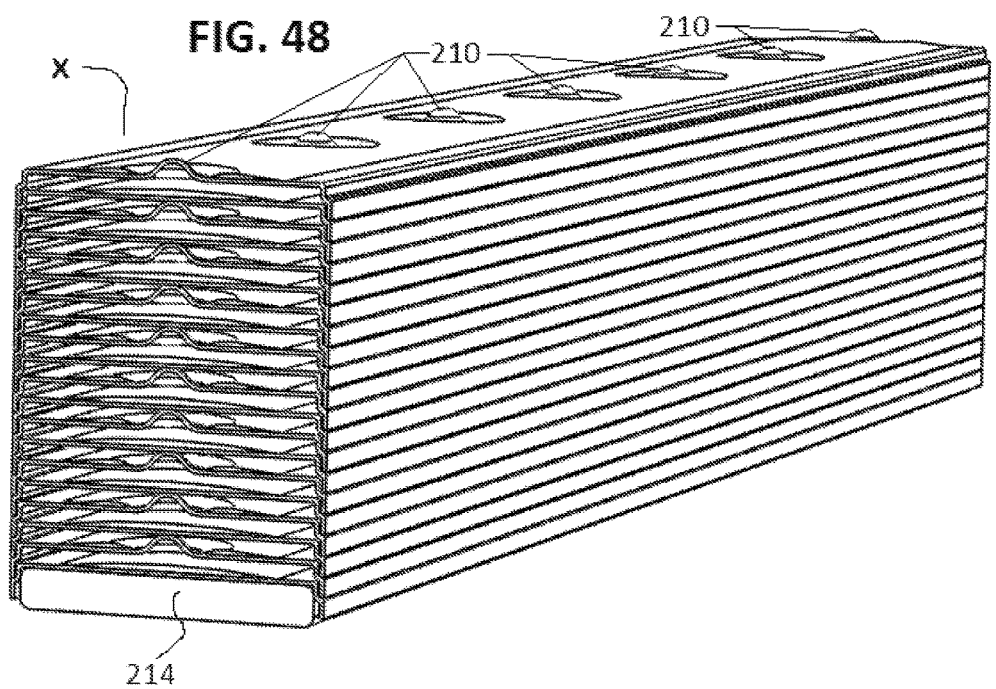
FIG. 48 is a perspective view of a stacked assembly of creature control members of the type illustrated in FIG. 46.

Creature control member X is preferably formed from a single piece and includes hollow obstructions or spacer members 210 and opposing skirts 212. Spacers 210 function to facilitate separation of adjacent creature control members X in a stacked assembly. A stacked assembly of creature control members X can be mounted on support 214 to facilitate shipping and transport. Spacers 210 of adjacent creature control members X are staggered to facilitate separation of the creature control members in a stacked assembly and prevent nesting of spacer members 210 of a lower creature control member X in spacers 210 of a creature control member X mounted directly on top of the lower creature control member X. As is readily seen in FIG. 46, spacers 210 of a lower creature control member contact the planar interior surface of a creature control member X mounted directly on top of the lower creature control member. In this embodiment, staggering is preferably achieved using two different molds to form the creature control members 210. However, staggering can be achieved in numerous other manners. The two molds have different orientations of spacers 210 to ensure that spacers 210 of adjacent members X are staggered or offset. Skirts 212 mate with the skirts 212 of the next lower creature control member X in a stacked assembly as seen in FIGS. 46 and 48.

Preferably, the bird repellent has low adhesive forces so birds cannot be trapped in the creature control substance (e.g., LVWGA or PJ). Accordingly, both surfaces 216 and spacers 210 or just surface 216 can be coated with the bird repellent. At least a portion of the exterior surface of skirts 212 of creature control member X should be free of bird repellent to allow an individual to grasps the non-coated surface to manipulate creature control member X.

Figure 49:
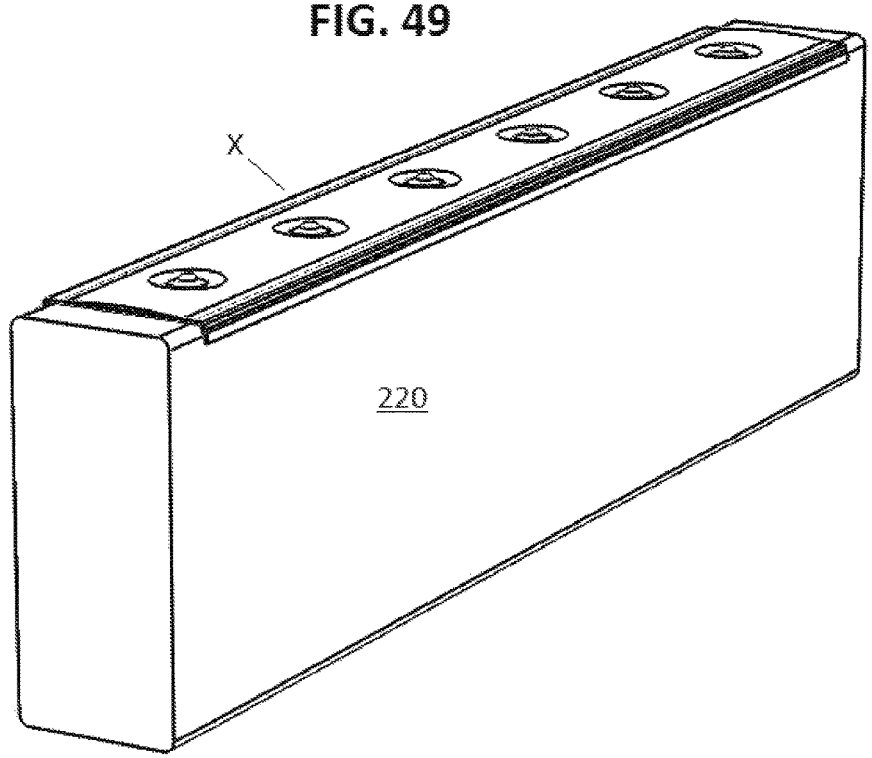
FIG. 49 is a perspective view of a single creature control member of the type illustrated in FIG. 46 mounted on a roof rafter.

The number and configuration of spacers 210 may be readily varied. For example, spacers 210 may take the form of any previously described spacer or rib. FIG. 49 illustrates mounting of a creature control member X on a roof rafter 220. However, the configuration of member X may be readily varied to be positioned in any desired location.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. An apparatus for trapping insects, said apparatus comprising:
   (a) a stacked assembly of insect traps including at least a first insect trap and a second insect trap;
   (b) said first insect trap having an insect trapping substance on at least a portion of an exterior surface of said first insect trap, said insect trapping substance being formed to trap insects on said first insect trap;
   (c) said second insect trap having an insect trapping substance on at least a portion of an exterior surface of said second insect trap, the insect trapping substance being formed to trap insects on said second insect trap wherein the stacked assembly is configured such that separation of the first insect trap from the second insect trap exposes the insect trapping substance of said second insect trap without removing any other element;
   (d) said first insect trap and said second insect trap each including a hollow cavity and at least one wall surrounding the hollow cavity, a portion of said second insect trap extends into said hollow cavity of said first insect trap; and,
   (e) said first insect trap has a first alignment member having an internal cavity, said second insect trap has a second alignment member having an internal cavity, at least a portion of said second alignment member of said second insect trap extends into said internal cavity of said first alignment member to prevent relative rotational movement between said first insect trap and said second inset trap in at least one direction.

2. The apparatus as set forth in claim 1, wherein:
   (a) the at least a portion of said first insect trap having the insect trapping substance has a plurality of points wherein each of the plurality of points have a different z-axis coordinate.

3. The apparatus as set forth in claim 2, wherein:
   (a) the at least a portion of said second insect trap having the insect trapping substance has a plurality of points wherein each of the plurality of points have a different z-axis coordinate.

4. The apparatus as set forth in claim 1, wherein:
   (a) the at least a portion of said first insect trap having the insect trapping substance is a curvilinear surface; and,
   (b) the at least a portion of said second insect trap having the insect trapping substance is a curvilinear surface.

5. The apparatus as set forth in claim 1, wherein:
(a) each of said first insect trap and said second insect trap are substantially conical in shape and include a central opening.

6. The apparatus as set forth in claim 1, wherein:
(a) each of said first insect trap and said second insect trap are shell portions configured to be mounted on a clothing article worn by an individual, wherein the clothing article includes an article worn on or about at least one of the following: (i) at least a portion of an individual's head; (ii) at least a portion of an individual's torso; (iii) at least a portion of an individual's arm; and (iv) at least a portion of an individual's leg.

7. The apparatus as set forth in claim 6, wherein:
(a) each of said first insect trap and said second insect trap including means for maintaining the corresponding insect trap in a desired position when mounted on the article of clothing worn by an individual.

8. The apparatus set forth in claim 6, wherein:
(a) said second insect trap includes at least one spacer for preventing the insect trapping substance of the second insect trap from coming into contact with any surface of said first insect trap.

9. The apparatus as set forth in claim 1, wherein:
said second insect trap includes at least one spacer for preventing the insect trapping substance of said second insect trap from coming into contact with any surface of said first insect trap.

10. The apparatus as set forth in claim 8, wherein:
(a) said second insect trap includes a portion formed from a single piece and said at least one spacer forms a section of said portion of said second insect trap.

11. The apparatus as set forth in claim 9, wherein:
(a) said at least one spacer includes a plurality of spacers.

12. The apparatus as set forth in claim 1, further including:
(a) a mounting assembly for mounting the stacked assembly on one of a motorized vehicle, water transport and powered earth working equipment wherein the motorized vehicle can transport at least one person and the water transport is either motorized or non-motorized.

13. The apparatus as set forth in claim 1, further including:
(a) an insect attracting member; said insect attracting member being at least one of: (i) a light; (ii) a light diffusing member; (iii) a light reflecting member; and, (iv) a light transmitting member; and,
(b) at least one of said first insect trap and said second insect trap of said stacked assembly being operably associated with said insect attracting member such that insects attracted by said insect attracting member will become trapped on the at least one of said first insect trap and said second insect trap of said stacked assembly.

14. An apparatus for trapping insects, said apparatus comprising:
(a) a stacked insect trap assembly including a plurality of insect traps, each of said plurality of insect traps having an insect trapping substance, said insect trapping substance being formed to trap insects on the corresponding insect trap;
(b) wherein said stacked insect trap assembly comprises at least a first insect trap and a second insect trap, where said first insect trap has a first alignment member having an internal cavity, said second insect trap has a second alignment member having an internal cavity, at least a portion of said second alignment member of said second insect trap extends into said internal cavity of said first alignment member to prevent relative rotational movement between said first insect trap and said second inset trap in at least one direction; and,
(c) a mounting assembly for mounting at least one of said plurality of insect traps of said stacked insect trap assembly in an operating position such that said insect trapping substance of said at least one of said plurality of insect traps is exposed to trap insects on said at least one of said plurality of insect traps, said mounting assembly including a light, said mounting assembly further including at least one housing member surrounding said light, said at least one housing member forming a hollow cavity, said mounting assembly further being configured to mount said at least one of said plurality of insect traps in said hollow cavity of said at least one housing member such that at least a portion of the light is disposed in a hollow cavity of a body of said at least one of said plurality of insect traps.

15. The apparatus as set forth in claim 14, wherein:
(a) said first insect trap includes a peripheral wall extending downwardly and around said second insect trap to conceal and protect said insect trapping substance of said second insect trap.

16. The apparatus as set forth in claim 15, wherein:
(a) said first insect trap and said second insect trap each being formed from a single piece of material.

17. An apparatus as set forth in claim 14, wherein:
(a) the mounting assembly mounts said at least one of insect traps of the stacked insect trap assembly in an elevated position in a room of a building.

18. An apparatus for trapping insects, said apparatus comprising:
(a) a nested stacked assembly of insect traps including at least a first insect trap and a second insect trap, said first insect trap extending into a portion of said second insect trap;
(b) said first insect trap having an insect trapping substance on at least a portion of said first insect trap, said insect trapping substance being formed to trap insects on said first insect trap;
(c) said second insect trap having an insect trapping substance on at least a portion of said second insect trap, the insect trapping substance being formed to trap insects on said second insect trap;
(d) where said first insect trap has a first alignment member having an internal cavity, said second insect trap has a second alignment member having an internal cavity, at least a portion of said first alignment member of said first insect trap extends into said internal cavity of said second alignment member to prevent relative rotational movement between said first insect trap and said second inset trap in at least one direction; and,
(d) a mounting assembly for mounting at least one of said first and second insect traps of said nested stacked insect trap assembly in an operating position adjacent a light such that said insect trapping substance of said at least one of said first and second insect traps is exposed to trap insects, said mounting assembly including the adjacent light, and a support member.

19. An apparatus for trapping insects, said apparatus comprising:
(a) a stacked insect trap assembly including a plurality of insect traps, each of said plurality of insect traps having a body forming a hollow cavity, each of said plurality of insect traps having an insect trapping substance formed on a portion of said body, said insect trapping substance being formed to trap insects on the corresponding insect trap;
(b) wherein said stacked insect trap assembly comprises at least a first insect trap and a second insect trap, where said first insect trap has a first alignment member having an internal cavity, said second insect trap has a second alignment member having an internal cavity, at least a portion of said second alignment member of said second insect trap extends into said internal cavity of said first alignment member to prevent relative rotational movement between said first insect trap and said second inset trap in at least one direction; and,
(c) a mounting assembly for mounting at least one of said plurality of insect traps of said stacked insect trap assembly in an operating position such that said insect trapping substance of said at least one of said plurality of insect traps is exposed to trap insects on said at least one of said plurality of insect traps, said mounting assembly including a light, and at least a portion of said mounting assembly being disposed in said hollow cavity of said at least one of said plurality of insect traps.

20. An apparatus for trapping insects, said apparatus comprising:
(a) a nested stacked assembly of insect traps each having a plurality of spacers, said nested stacked assembly of insect traps including at least a first insect trap and a second insect trap, wherein said first insect trap and said second insect trap being configured such that when said first insect trap and said second insect trap are positioned in a first nested stacked orientation each of said plurality of spacers of said first insect trap are aligned with a corresponding spacer of said second insect trap and when said first insect trap is rotated relative to said second insect trap a predetermined number of degrees from said first nested stacked orientation to a second nested stacked orientation none of said plurality of spacers of said first insect trap are aligned with any of said plurality of spacers of said second insect trap;
(b) said first insect trap having an insect trapping substance on at least a portion of an exterior surface of said first insect trap, said insect trapping substance being formed to trap insects on said first insect trap; and,
(c) said second insect trap having an insect trapping substance on at least a portion of an exterior surface of said second insect trap, the insect trapping substance being formed to trap insects on said second insect trap wherein the nested stacked assembly is configured such that when in the second nested stacked orientation separation of the first insect trap from the second insect trap exposes the insect trapping substance of said second insect trap without removing any other element.

* * * * *